(12) United States Patent
Tobita et al.

(10) Patent No.: US 8,698,069 B2
(45) Date of Patent: Apr. 15, 2014

(54) SWITCH

(75) Inventors: Kokichi Tobita, Kyoto (JP); Kazuaki Morita, Kyoto (JP)

(73) Assignee: Omron Corporation, Kyoto (JP)

( * ) Notice: Subject to any disclaimer, the term of this patent is extended or adjusted under 35 U.S.C. 154(b) by 250 days.

(21) Appl. No.: 13/321,622

(22) PCT Filed: Mar. 16, 2011

(86) PCT No.: PCT/JP2011/056236
§ 371 (c)(1),
(2), (4) Date: Jan. 26, 2012

(87) PCT Pub. No.: WO2012/073531
PCT Pub. Date: Jun. 7, 2012

(65) Prior Publication Data
US 2012/0235025 A1   Sep. 20, 2012

(30) Foreign Application Priority Data

Dec. 3, 2010  (JP) .................................. 2010-270712

(51) Int. Cl.
*H03K 17/78*   (2006.01)
(52) U.S. Cl.
USPC .................. 250/221; 250/214 SW; 250/208.4; 340/644
(58) Field of Classification Search
USPC ............ 250/221, 222.1, 214 SW, 216, 208.4; 200/61.27, 61.45 R; 340/555, 635, 644
See application file for complete search history.

(56) References Cited

U.S. PATENT DOCUMENTS

| 4,992,777 A | 2/1991 | Keisuke et al. |
| 5,015,996 A | 5/1991 | Konishi et al. |
| 7,173,887 B2 * | 2/2007 | Kimikawa ................. 369/44.14 |
| 2006/0065819 A1 * | 3/2006 | Sugiyama et al. ............ 250/221 |

FOREIGN PATENT DOCUMENTS

| JP | 6443934 | 2/1989 |
| JP | 02281513 | 11/1990 |

OTHER PUBLICATIONS

Technical Guide for Limit Switches, Omron Corporation, Nov. 19, 2010.

* cited by examiner

*Primary Examiner* — Kevin Pyo
(74) *Attorney, Agent, or Firm* — Karl F. Milde, Jr.; Eckert Seamans Cherin & Mellott, LLC

(57) ABSTRACT

A slit is formed in a plunger of a limit switch in such a manner that an amount of light incident on a light receiving element is changed in accordance with displacement of the plunger. The limit switch is provided with a setting processing unit (123) for setting a voltage value outputted from the light receiving element as a threshold value when a setting instruction is inputted in a state where the plunger is displaced to a designated position by a user, a position detecting unit (113) for performing detection processing of detecting whether or not the plunger is placed at a closer position to a reference position than to the designated position by comparing the set threshold value and the voltage value outputted from the light receiving element, and an output signal controlling unit (119) for outputting a signal based on a result of the detection processing. Thereby, the switch for outputting the signal in accordance with a position of a displacement member, the switch being capable of easily outputting the signal in accordance with a desired position of the displacement member without need for an adjusting screw can be provided.

8 Claims, 19 Drawing Sheets

Fig. 17

| Determination unit identification information | Light receiving element identification information |
|---|---|
| First determination unit | Light receiving element 61 |
| Second determination unit | Light receiving element 62 |
| ⋮ | ⋮ |

SWITCH

TECHNICAL FIELD

The present invention relates to a switch provided with a displacement member to be displaced in accordance with a load of force from an exterior, the switch for outputting a signal in accordance with a position of the displacement member.

BACKGROUND ART

Conventionally, there is a known limit switch used for automatically starting up a processing machine upon detecting that a physical body such as a product to be processed moves to a predetermined position in a production line of a factory. OMRON Corporation "Limit switch technical guide", http://www.fa.omron.co.jp/data_pdf/commentary/limitswitch_apparatus_tg_j_3_1_1-5.pdf, Nov. 19, 2010.

Such a limit switch is provided with a displacement member to be displaced in accordance with a load of force from an exterior, and outputs a signal in accordance with a position of this displacement member. Japanese Unexamined Patent Publication No. 2-281513, published on Nov. 10, 1990 (hereinafter "Patent Document 1") and Japanese Unexamined Patent Publication No. 64-43934, published on Feb. 16, 1989 (hereinafter "Patent Document 2"). Therefore, in Patent Documents 1 and 2, a contact mechanism to be brought into contact thereto upon the displacement member being placed at a predetermined position is provided, and a position of the displacement member is detected based on whether or not there is an electric contact in the contact mechanism. In Patent Document 2, provision of a plurality of contact mechanisms detects a plurality of positions of the displacement member.

In a case where the position of the displacement member is detected by the contact mechanism as in Patent Documents 1 and 2, due to dimension variations of members constituting the contact mechanism, a difference may be generated between the position of the displacement member detectable by the contact mechanism and a desired position of the displacement member. Thus, in Patent Document 2, an adjusting screw is provided in order to eliminate such a difference.

SUMMARY OF THE INVENTION

Problems to be Solved by the Invention

However, an adjusting task by the adjusting screw is to repeat a task of slightly rotating the adjusting screw and a task of confirming the position of the displacement member detectable by the contact mechanism after rotation, and hence takes extra effort.

In a case where the plurality of positions of the displacement member is to be detected, there is a need for the adjusting task for each of the contact mechanisms corresponding to the positions of the displacement members. As a result, there is a problem that the adjusting task takes time.

The present invention is achieved in order to solve the above problems, and an object of the invention is to provide a switch provided with a displacement member to be displaced in accordance with a load of force from an exterior, the switch for outputting a signal in accordance with a position of this displacement member, the switch being capable of easily outputting a signal in accordance with a desired position of the displacement member without need for an adjusting screw.

Means for Solving the Problem

In order to solve the above problems, a switch of the present invention includes a displacement member to be displaced in accordance with a load of force from an exterior, a signal output means for outputting a signal in accordance with a position of the displacement member, a light emitting element for emitting light from a light emitting surface, and a light receiving element having a light receiving surface facing the light emitting surface, the light receiving element for outputting a characteristic amount indicating an amount of the light incident on the light receiving surface, wherein the displacement member is disposed between the light emitting surface and the light receiving surface, and placed at a reference position when there is no load of the force from the exterior, an opening through which the light passes is formed in the displacement member in such a manner that the amount of the light incident on the light receiving surface among the light emitted from the light emitting surface is changed in accordance with displacement of the displacement member, the switch further includes a setting processing means for setting the characteristic amount outputted from the light receiving element as a threshold value when a setting instruction is inputted in a state where the displacement member is displaced to a designated position, and a position detection means for performing detection processing of detecting whether or not the displacement member is placed at a closer position to the reference position than to the designated position by comparing the threshold value set by the setting processing means and the characteristic amount outputted from the light receiving element, and the signal output means outputs the signal based on a result of the detection processing performed by the position detection means.

According to the above configuration, the opening through which the light passes is formed in the displacement member in such a manner that the amount of the light incident on the light receiving surface among the light emitted from the light emitting surface is changed in accordance with the displacement of the displacement member. Therefore, since the amount of the light incident on the light receiving surface is differentiated by the position of the displacement member, the characteristic amount outputted from the light receiving element is changed by the position of the displacement member. Whether or not the displacement member is placed at a closer position to the reference position than to the designated position or whether or not the displacement member is placed at the designated position is detected by setting the characteristic amount outputted from the light receiving element in a state where the displacement member is displaced to the designated position as the threshold value and comparing the set threshold value and the characteristic amount outputted from the light receiving element. Therefore, when a user only inputs the setting instruction in a state where the displacement member is displaced to the designated position, the characteristic amount in that state is set as the threshold value, and the position of the displacement member can be detected. As a result, the signal in accordance with the position of the displacement member can be easily outputted. Thereby, the switch capable of easily outputting the signal in accordance with a desired position of the displacement member without need for an adjusting screw can be provided.

Effect of the Invention

According to the present invention, with the switch provided with the displacement member to be displaced in accordance with the load of the force from the exterior, the switch for outputting the signal in accordance with the position of this displacement member, there is an effect that the signal in accordance with the desired position of the displacement member can be easily outputted without need for the adjusting screw.

BRIEF DESCRIPTION OF THE DRAWINGS

FIG. 17 is a view showing one example of an extraction table.

EMBODIMENT FOR CARRYING OUT THE INVENTION

With reference to the drawings, an embodiment of the present invention will be described. In the following description, the same parts will be given the same reference symbols. Names and functions of the parts are also the same. Therefore, detailed description thereof will not be repeated.

<Entire Configuration of Limit Switch>

Figure 1:
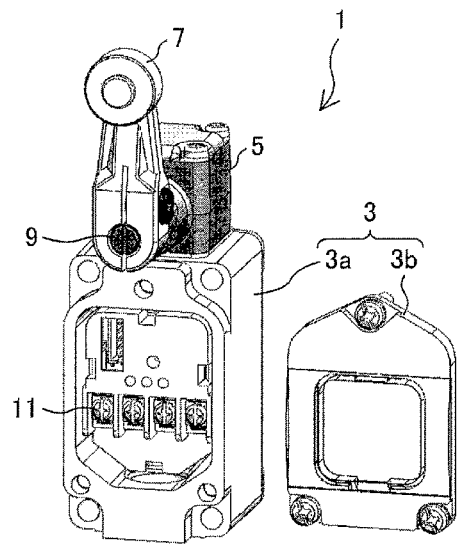
FIG. 1 is a perspective view showing a limit switch in the present embodiment.

FIG. 1 is a perspective view showing a limit switch in the present embodiment. The limit switch is a switch for detecting a position, change, movement, passage, or the like, and outputting an ON signal or an OFF signal in accordance with detection or non-detection. Considering that the limit switch of the present embodiment is applied to a place where mechanical strength and environmental resistance are required, the limit switch is preferably formed to be protected from external force, water, oil, gas, grit and dust, and the like.

As shown in FIG. 1, a limit switch 1 is provided with a casing 3, an installment block 5, and an actuation body 7.

The casing 3 in which a switch module 11 is disposed in an internal space thereof is to protect the switch module 11 from the external force, the water, the oil, the gas, the grit and the dust, and the like. The casing 3 includes a casing main body 3a having an opening for assembling the switch module 11 into the internal space, and a lid portion 3b for closing the opening.

The installment block 5 is attached to an upper part of the casing 3. The actuation body 7 is rotatably attached to the installment block 5 by a screw 9.

The actuation body 7 protrudes from the installment block 5, and a position thereof when force is not applied from an exterior due to contact with a physical body is a fixed position. The fixed position of the actuation body 7 is shown as a position where the actuation body 7 is directed in 0 o'clock of a watch. In FIG. 1, the actuation body 7 is rotated clockwise on the screw 9 when the force is applied from the left side, and thereafter returned to the fixed position when the force is removed. Meanwhile, the actuation body 7 is rotated anticlockwise on the screw 9 when the force is applied from the right side, and thereafter returned to the fixed position when the force is removed. It should be noted that hereinafter, a position of the actuation body is indicated by an angle from the fixed position. As described later, setting is made in such a manner that the switch module 11 is operated by rotation of the actuation body 7.

It should be noted that seal members are disposed at connection points of the casing main body 3a, the lid portion 3b, the installment block 5, and the actuation body 7, so as to prevent intrusion of the water, the oil, the gas, and the like.

<Configuration of Switch Module>

As described above, the switch module is disposed in the internal space of the casing 3. This switch module 11 is to output various signals in accordance with the position of the actuation body 7.

Figure 2:
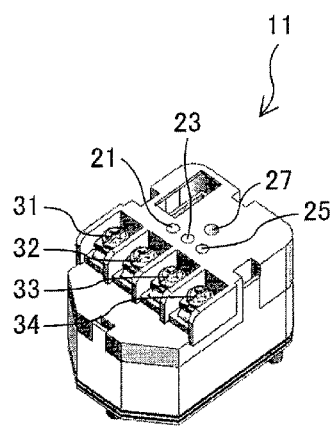
FIG. 2 is a view showing a switch module provided in the limit switch.

FIG. 2 is a view showing an outer appearance of the switch module. As shown in FIG. 2, the switch module 11 is provided with a microcomputer (not shown) for controlling the entire switch module 11, lighting units 21, 23, 25, a mode switch 27, and terminals 31 to 34.

The mode switch 27 is a switch for switching a mode to any of a normal mode and a setting mode, and has a button to be pressed by a user. The setting mode is a mode for setting the position of the actuation body 7 to be detected. The normal mode is a mode in which the switch module 11 outputs the various signals in accordance with the position set in the setting mode.

The terminals 31, 32 are terminals to be connected to a device for supplying electric power. The terminals 33, 34 are terminals to be connected to a device used for tasks in a production line. The microcomputer provided in the switch module 11 controls the entire switch module 11 and outputs the various signals in accordance with the position of the actuation body 7 from the terminals 33, 34.

The microcomputer also controls lighting of the lighting units 21, 25 in accordance with the position of the actuation body 7. It should be noted that the lighting units 21, 23, 25 are formed by an LED lighting circuit that emits light upon supply of the electric power, and a light guide rod for guiding the light emitted from the LED lighting circuit to a surface of the switch module 11. The lighting unit 23 emits the light upon the supply of the electric power from the exterior, and specifically is a power supply lamp.

Figure 3:
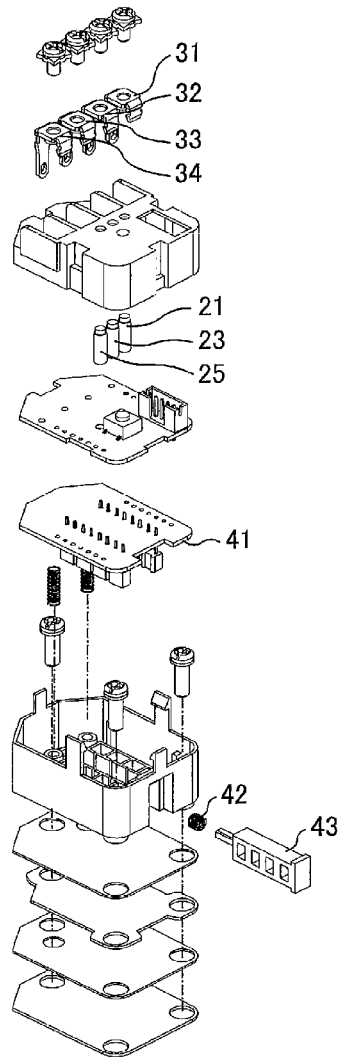
FIG. 3 is a perspective view when the switch module is disassembled.

FIG. 3 is a perspective view when the switch module is disassembled. As shown in FIG. 3, in addition to the terminals 31 to 34 and the lighting units 21, 23, 25, the switch module 11 is provided with a photointerrupter unit 41 serving as an optical sensor, a coil spring 42, and a plunger 43.

The photointerrupter unit 41 has a plurality of light emitting elements and light receiving elements. The light emitting elements emit light with high linearity, and, for example, are light emitting diodes. The light receiving elements are, for example, single phototransistors, photo ICs, or photodiodes.

The plunger 43 is a rod shape part, and has a plurality of slits (openings). The plunger 43 can be moved in parallel in the longitudinal direction of the plunger 43 in conjunction with movement of the actuation body 7. That is, the plunger 43 is a displacement member to be displaced in accordance with a load of the force from the exterior. It should be noted that various known techniques can be used as a mechanism of moving the plunger 43 in conjunction with the movement of the actuation body 7. As described in Patent Document 1, a part of a rotation shaft of the actuation body 7 is formed into a flat shape, and the flat part and one end in the longitudinal direction of the plunger 43 are formed to be brought into contact with each other. Here, a position of the plunger 43 when the actuation body 7 is placed at the fixed position (that is, in a state where the actuation body 7 is not in contact with the physical body and not rotated) and the flat part and the plunger 43 are brought into contact with each other is a reference position. In this case, the flat part is also rotated by the rotation of the actuation body 7, so that the force can be applied to the plunger 43 in the longitudinal direction of the plunger 43. As a result, the plunger 43 is displaced from the reference position along the longitudinal direction thereof. Bias force for returning to the reference position is applied to the plunger 43 by the coil spring 42. Therefore, when the actuation body 7 is returned to the fixed position, the plunger 43 is also returned to the reference position by the bias force of the coil spring 42.

Figure 4:
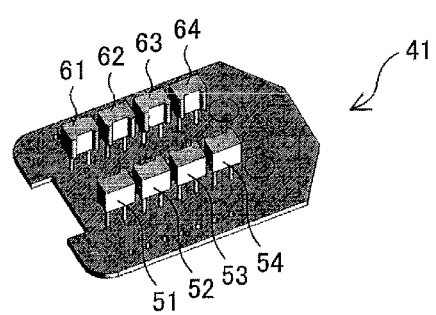
FIG. 4 is a perspective view showing a photointerrupter unit provided in the switch module together with a substrate.

FIG. 4 is a perspective view showing the photointerrupter unit together with a substrate. As shown in FIG. 4, the photointerrupter unit 41 includes light emitting elements 51 to 54 having the same shape and the same size, and light receiving elements 61 to 64 having the same shape and the same size as the light emitting elements 51 to 54. It should be noted that although the light emitting elements 51 to 54 and the light receiving elements 61 to 64 have the same shape and the same size here, the shape and the size are not necessarily all the same.

The light emitting elements 51 to 54 and the light receiving elements 61 to 64 are aligned on the same straight line along the longitudinal direction of the plunger 43. A light emitting part (a light emitting surface) of the light emitting element 51 faces a light receiving part (a light receiving surface) of the light receiving element 61. Similarly, a light emitting part (a light emitting surface) of the light emitting element 52 faces a light receiving part (a light receiving surface) of the light receiving element 62, a light emitting part (a light emitting surface) of the light emitting element 53 faces a light receiving part (a light receiving surface) of the light receiving element 63, and a light emitting part (a light emitting surface) of the light emitting element 54 faces a light receiving part (a light receiving surface) of the light receiving element 64. Therefore, the light receiving elements 61 to 64 can receive the lights emitted by the light emitting elements 51 to 54 by a one-to-one relationship. That is, the light emitting element 51 and the light receiving element 61 form one photointerrupter (a light detection unit) for detecting existence or non-existence of the physical body between the light emitting element 51 and the light receiving element 61. Similarly, each of a combination of the light emitting element 52 and the light receiving element 62, a combination of the light emitting element 53 and the light receiving element 63, and a combination of the light emitting element 54 and the light receiving element 64 serves as one photointerrupter (a light detection unit).

The light emitting elements 51 to 54 and the light receiving elements 61 to 64 are disposed so as to be spaced from each other by a distance being width in the short direction of the plunger 43, or a distance slightly larger than the width. Thereby, the plunger 43 can be disposed between the light emitting elements 51 to 54 and the light receiving elements 61 to 64. By this arrangement, the plunger 43 moves in parallel in the perpendicular direction to the direction in which the light emitting elements 51 to 54 and the light receiving elements 61 to 64 respectively face each other, in conjunction with the movement of the actuation body 7.

Figure 5:
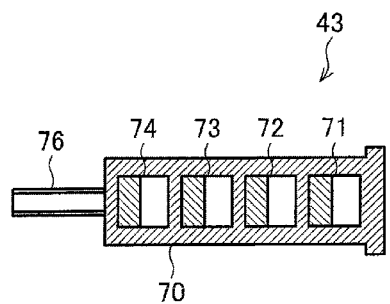
FIG. 5 is a view showing a front surface of a plunger provided in the switch module.
Figure 6:
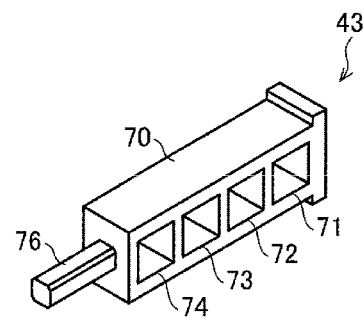
FIG. 6 is a perspective view of the plunger seen from the front surface side.
Figure 7:
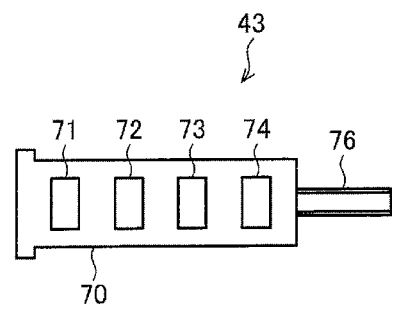
FIG. 7 is a view showing a back surface of the plunger.
Figure 8:
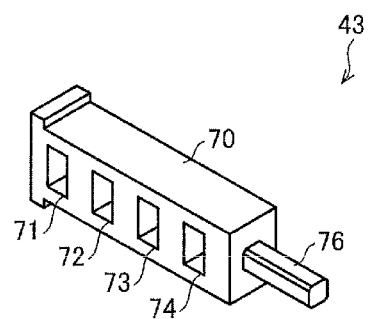
FIG. 8 is a perspective view of the plunger seen from the back surface side.
Figure 9:
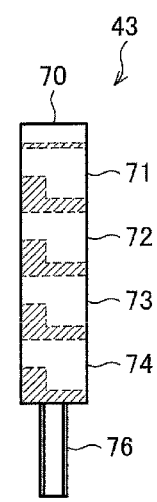
FIG. 9 is a view showing a cross section of the plunger.

FIG. 5 is a view showing a front surface of the plunger. FIG. 6 is a perspective view of the plunger seen from the front surface side. FIG. 7 is a view showing a back surface of the plunger. FIG. 8 is a perspective view of the plunger seen from the back surface side thereof. FIG. 9 is a view showing a cross section of the plunger. As shown in FIGS. 5 to 9, the plunger 43 has a main body portion 70 and a projection portion 76.

The projection portion 76 is combined with the main body portion 70 and is thinner than the main body portion 70. The projection portion 76 is inserted into the coil spring 42.

The main body portion 70 has slits (openings) 71 to 74. Here, since shapes of the slits 71 to 74 are the same to each other, the slit 71 will be described. An opening of the slit 71 has different sizes respectively for the front surface and the back surface of the plunger 43. Specifically, a shape of the opening of the slit 71 in the cross section is a shape of regions not indicated by diagonal lines among a region surrounded by broken lines as shown in FIG. 9. The size of the opening of the slit 71 on the front surface of the plunger 43 is set to be larger than the size of the opening of the slit 71 on the back surface of the plunger 43.

<Positional Relationship between Photointerrupter and Plunger>

Figure 10:
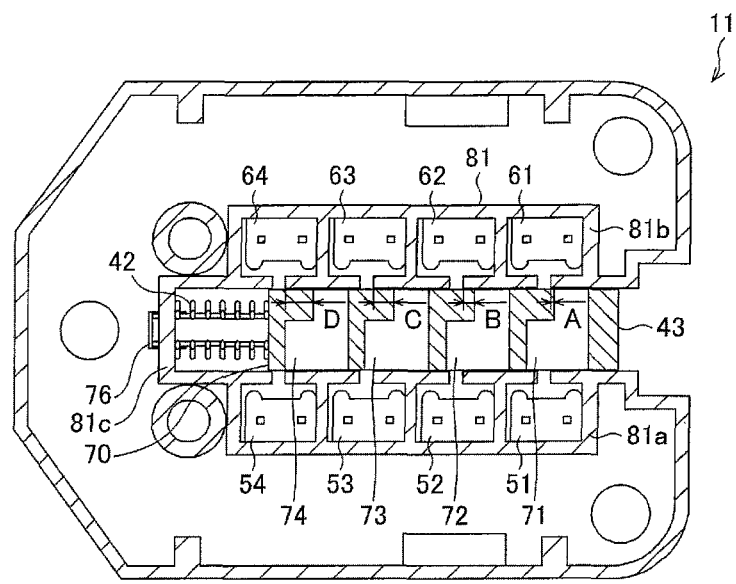
FIG. 10 is a first view showing a positional relationship among a plurality of light emitting elements, a plurality of light receiving elements, and the plunger in a cross section of the switch module.
Figure 11:
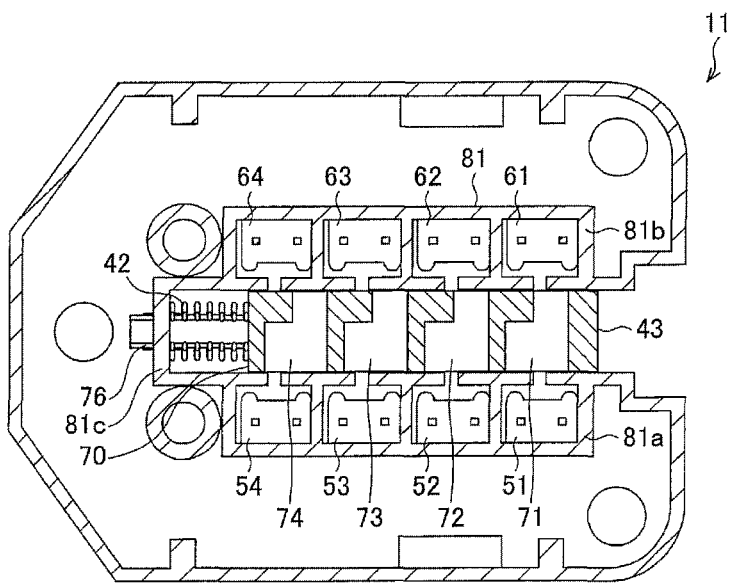
FIG. 11 is a second view showing a positional relationship among the plurality of light emitting elements, the plurality of light receiving elements, and the plunger in the cross section of the switch module.
Figure 12:
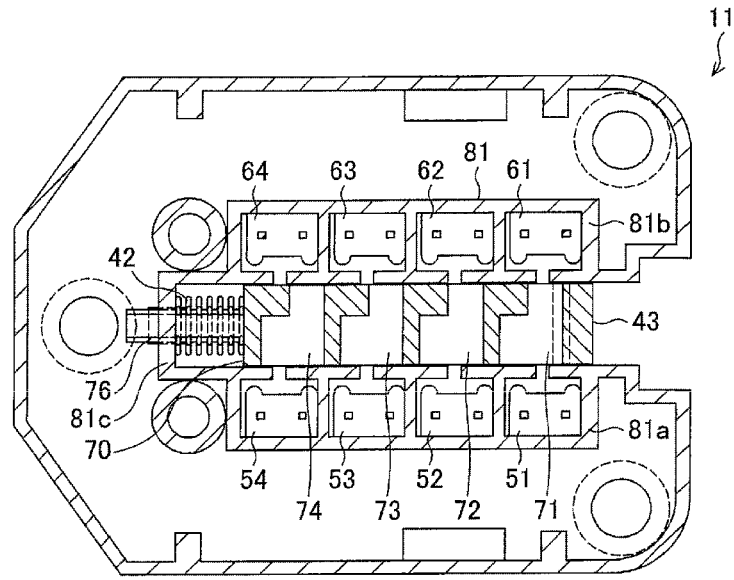
FIG. 12 is a third view showing a positional relationship among the plurality of light emitting elements, the plurality of light receiving elements, and the plunger in the cross section of the switch module.
Figure 13:
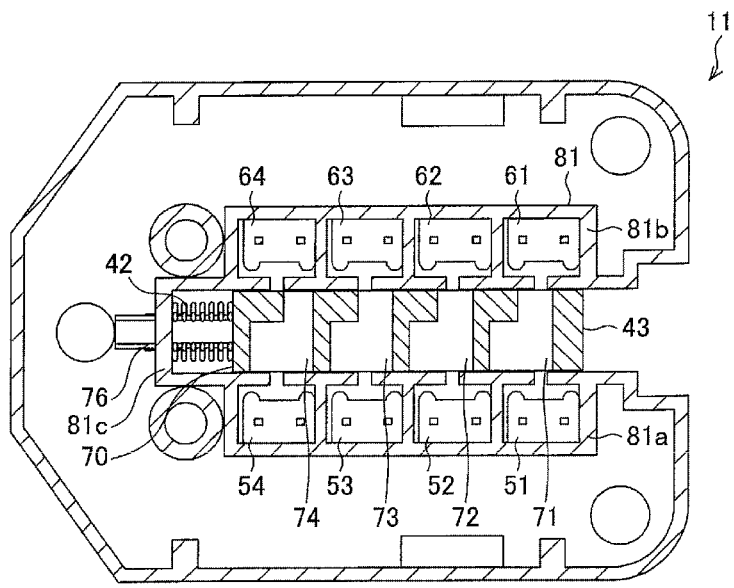
FIG. 13 is a fourth view showing a positional relationship among the plurality of light emitting elements, the plurality of light receiving elements, and the plunger in the cross section of the switch module.
Figure 14:
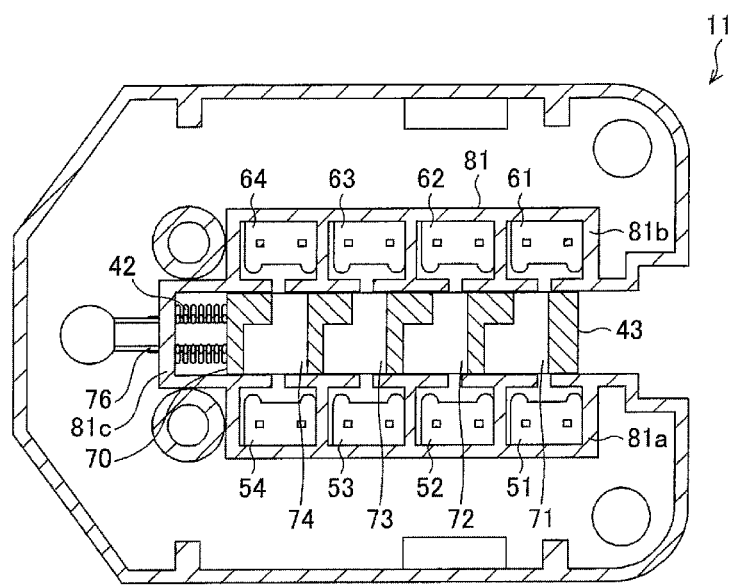
FIG. 14 is a fifth view showing a positional relationship among the plurality of light emitting elements, the plurality of light receiving elements, and the plunger in the cross section of the switch module.

FIGS. 10 to 14 are views showing positional relationships among the plurality of light emitting elements, the plurality of light receiving elements, and the plunger in a cross section of the switch module. It should be noted that FIG. 10 is a view when the actuation body 7 is placed at the fixed position, FIG. 11 is a view when the actuation body 7 is placed at a position of 15 degrees (that is, a position where the actuation body 7 is rotated by 15 degrees from the fixed position), FIG. 12 is a view when the actuation body 7 is placed at a position of 22.5 degrees, FIG. 13 is a view when the actuation body 7 is placed at a position of 30 degrees, and FIG. 14 is a view when the actuation body 7 is placed at a position of 42.5 degrees. Here, positions at which the light emitting elements 51 to 54 and the light receiving elements 61 to 64 are disposed are as shown in FIG. 4.

As shown in FIGS. 10 to 14, the switch module 11 is provided with a partition plate 81. The partition plate 81 is a plate for partitioning the light emitting elements 51 to 54, the light receiving elements 61 to 64, and the plunger 43. Specifically, the partition plate 81 is provided with a first partition plate 81a for partitioning the light emitting elements 51 to 54 and the plunger 43, a second partition plate 81b for partitioning the light receiving elements 61 to 64 and the plunger 43, and a third partition plate 81c placed between the first partition plate 81a and the second partition plate 81b. The plunger 43 is disposed between the first partition plate 81a and the second partition plate 81b. The back surface of the plunger 43 is adjacent to the second partition plate 81b, and the front surface of the plunger 43 is adjacent to the first partition plate 81a. That is, the front surface of the plunger 43 faces the light emitting elements 51 to 54, and the back surface of the plunger 43 faces the light receiving elements 61 to 64. It should be noted that as shown in FIG. 5, a part of the main body portion 70 of the plunger 43 other than the slits 71 to 74 is indicated by diagonal lines. Hereinafter, the part of the diagonal lines will be a light blocking region.

The first partition plate 81a partitions each of the light emitting elements 51 to 54, and the second partition plate 81b partitions each of the light receiving elements 61 to 64. The first partition plate 81a has a plurality of openings corresponding to the positions at which the light emitting elements 51 to 54 are respectively disposed. Specifically, the plurality of openings provided in the first partition plate 81a is respectively placed at positions where the lights respectively emitted by the light emitting elements 51 to 54 can pass through. The second partition plate 81b has a plurality of openings corresponding to the positions at which the light receiving elements 61 to 64 are respectively disposed. Specifically, the plurality of openings provided in the second partition plate 81b is respectively placed at positions where the light receiving elements 61 to 64 can respectively receive the light from the light emitting elements 51 to 54. Therefore, regions linearly connecting the openings formed in the first partition plate 81a and the openings formed in the second partition plate 81b corresponding to the above openings are regions through which the lights emitted from the light emitting elements pass (light path regions).

Further, the third partition plate 81c has a hole through which only the projection portion 76 of the plunger 43 is inserted. Therefore, the coil spring 42 into which the projection portion 76 is inserted exists between the third partition plate 81c and the main body portion 70. When the plunger 43 moves in parallel toward the third partition plate 81c in accordance with the movement of the actuation body 7, the coil spring 42 is compressed between the main body portion 70 of the plunger 43 and the third partition plate 81c so as to give force of returning the plunger 43 to the reference position to the plunger 43.

As described above, the plunger 43 moves in the longitudinal direction thereof in conjunction with the movement of the actuation body 7. In the middle of this movement, the slit 71 is formed in the plunger 43 in such a manner that the slit 71 is overlapped with the opening of the first partition plate 81a corresponding to the light emitting element 51 and the opening of the second partition plate 81b corresponding to the light receiving element 61. Similarly, the slit 72 is formed in the plunger 43 in such a manner that the slit 72 is overlapped with the opening of the first partition plate 81a corresponding to the light emitting element 52 and the opening of the second partition plate 81b corresponding to the light receiving element 62. The slit 73 is formed in the plunger 43 in such a manner that the slit 73 is overlapped with the opening of the first partition plate 81a corresponding to the light emitting element 53 and the opening of the second partition plate 81b corresponding to the light receiving element 63. Further, the slit 74 is formed in the plunger 43 in such a manner that the slit 74 is overlapped with the opening of the first partition plate 81a corresponding to the light emitting element 54 and the opening of the second partition plate 81b corresponding to the light receiving element 64. In such a way, the slits 71 to 74 respectively correspond to the light emitting elements 51 to 54 and the light receiving elements 61 to 64.

However, a distance between each of the openings on the back surface side of the slits 71 to 74 and each of the openings of the second partition plate 81b corresponding to the slits is different among the slits 71 to 74. Specifically, as shown in FIG. 10, positions of the slits 71 to 74 are set in such a manner that when the actuation body 7 is placed at the fixed position (that is, when the plunger 43 is placed at the reference position), the distance is gradually increased in the order of a distance A between the opening on the back surface side of the slit 71 and the opening of the second partition plate 81b corresponding to the slit 71, a distance B between the opening on the back surface side of the slit 72 and the opening of the second partition plate 81b corresponding to the slit 72, a distance C between the opening on the back surface side of the slit 73 and the opening of the second partition plate 81b corresponding to the slit 73, and a distance D between the opening on the back surface side of the slit 74 and the opening of the second partition plate 81b corresponding to the slit 74.

Here, a position with which a displacement amount from the reference position becomes minimum among positions of the plunger 43 when the light receiving elements 61 to 64 detect the light passing through the slits 71 to 74 serves as a light detection start position. In this case, the above distances A to D indicate distances from the reference position to the light detection start position.

When such a plunger 43 moves in parallel in conjunction with the movement of the actuation body 7, the lights emitted by the light emitting elements 51 to 54 are blocked or pass through in accordance with the position of the plunger. Specifically, when the openings provided in the second partition plate 81*b* and the light blocking region of the plunger 43 are overlapped by a change in the position of the plunger 43, the plunger 43 blocks the light to the light receiving elements corresponding to the openings. When the openings provided in the second partition plate 81*b* and the slits of the plunger 43 are at least partially overlapped, the plunger 43 allows the light to pass through to the light receiving elements corresponding to the openings. In other words, when light paths from the light emitting elements 51 to 54 to the light receiving elements 61 to 64 and at least part of the slits 71 to 74 are overlapped, the light passes therethrough. At this time, amounts of the light incident on the light receiving elements are proportional to size of regions where the openings provided in the second partition plate 81*b* and the openings of the slits are overlapped.

A light to be blocked by the plunger 43 among the lights respectively emitted by the light emitting elements 51 to 54 corresponds to the position of the plunger 43, that is, the angle of the actuation body 7 from the fixed position. Hereinafter, with reference to FIGS. 10 to 15, as the angle of the actuation body 7 from the fixed position is changed, how presence or absence of light incidence on the light receiving elements 61 to 64 and the amounts of the incident light are changed will be described.

As shown in FIG. 10, the plunger 43 blocks all the lights emitted by the light emitting elements 51 to 54 when the actuation body 7 is placed at a position of 0 degree (the fixed position). Specifically, the light blocking region of the plunger 43 covers all the openings corresponding to positions at which the light receiving elements 61 to 64 are arranged in the second partition plate 81*b*. Therefore, the lights respectively emitted by the light emitting elements 51 to 54 are blocked by the plunger 43 and do not reach the light receiving elements 61 to 64.

From a state shown in FIG. 10, the actuation body 7 is rotated, and the plunger 43 is moved in the longitudinal direction thereof. At this time, as described above, the distance A between the opening on the back surface side of the slit 71 and the opening of the second partition plate 81*b* corresponding to the slit 71 is shorter than the other distances B to D. Thus, only the opening on the back surface side of the slit 71 and the opening of the second partition plate 81*b* corresponding to the light receiving element 61 start overlapping. Thereafter when a movement amount of the plunger 43 is increased with an increase in the angle of the actuation body 7, an overlapping region of the opening on the back surface side of the slit 71 and the opening of the second partition plate 81*b* corresponding to the light receiving element 61 is increased, and the opening on the back surface side of the slit 72 and the opening of the second partition plate 81*b* corresponding to the light receiving element 62 start overlapping.

As shown in FIG. 11, when the actuation body 7 is placed at the position of 15 degrees, the opening on the back surface side of the slit 71 is overlapped with the entire region of the opening of the second partition plate 81*b* corresponding to the light receiving element 61. In other words, the opening of the slit 71 is placed all over a space (the light path region) linearly connecting the opening corresponding to the position at which the light emitting element 51 is disposed in the first partition plate 81*a* and the opening corresponding to the position at which the light receiving element 61 is disposed in the second partition plate 81*b*. Further, the opening on the back surface side of the slit 72 is overlapped with part of the opening of the second partition plate 81*b* corresponding to the light receiving element 62. In other words, only part of the opening of the slit 72 is placed in a space (the light path region) linearly connecting the opening corresponding to the position at which the light emitting element 52 is disposed in the first partition plate 81*a* and the opening corresponding to the position at which the light receiving element 62 is disposed in the second partition plate 81*b*. Therefore, a light receiving amount of the light receiving element 61 has a maximum value, and the light receiving element 62 receives only part of the light emitted from the light emitting element 52. In this stage, the light blocking region of the plunger 43 still covers the openings of the second partition plate 81*b* corresponding to the positions at which the light receiving elements 63, 64 are disposed. Thus, the light does not reach the light receiving elements 63, 64.

From a state shown in FIG. 11, the actuation body 7 is further rotated, and the plunger 43 is moved in the longitudinal direction thereof. At this time, when the movement amount of the plunger 43 is increased with the increase in the angle of the actuation body 7, an overlapping region of the opening on the back surface side of the slit 72 and the opening of the second partition plate 81*b* corresponding to the light receiving element 62 is increased, and the opening on the back surface side of the slit 73 and the opening of the second partition plate 81*b* corresponding to the light receiving element 63 start overlapping.

As shown in FIG. 12, when the actuation body 7 is placed at the position of 22.5 degrees, the openings on the back surface side of the slits 71, 72 are respectively overlapped with the entire regions of the openings of the second partition plate 81*b* corresponding to the light receiving elements 61, 62. In other words, the opening of the slit 71 is placed all over the space (the light path region) linearly connecting the opening corresponding to the position at which the light emitting element 51 is disposed in the first partition plate 81*a* and the opening corresponding to the position at which the light receiving element 61 is disposed in the second partition plate 81*b*. Similarly, the opening of the slit 72 is placed all over the space (the light path region) linearly connecting the opening corresponding to the position at which the light emitting element 52 is disposed in the first partition plate 81*a* and the opening corresponding to the position at which the light receiving element 62 is disposed in the second partition plate 81*b*. In addition, the opening on the back surface side of the slit 73 is overlapped with part of the opening of the second partition plate 81*b* corresponding to the light receiving element 63. In other words, only part of the opening of the slit 73 is placed in a space (the light path region) linearly connecting the opening corresponding to the position at which the light emitting element 53 is disposed in the first partition plate 81*a* and the opening corresponding to the position at which the light receiving element 63 is disposed in the second partition plate 81*b*. Therefore, light receiving amounts of the light receiving elements 61, 62 have maximum values, and the light receiving element 63 receives only part of the light emitted from the light emitting element 53. It should be noted that in this stage, the light blocking region of the plunger 43 still covers the opening of the second partition plate 81*b* corresponding to the position at which the light receiving element 64 is disposed. Therefore, the light does not reach the light receiving element 64.

When the actuation body 7 is further rotated, and the plunger 43 is moved in the longitudinal direction thereof from a state shown in FIG. 12, an overlapping region of the opening on the back surface side of the slit 73 and the opening of the second partition plate 81b corresponding to the light receiving element 63 is increased.

As shown in FIG. 13, when the actuation body 7 is placed at the position of 30 degrees, the openings on the back surface side of the slits 71, 72, 73 are respectively overlapped with the entire regions of the openings of the second partition plate 81b corresponding to the light receiving elements 61, 62, 63. Therefore, light receiving amounts of the light receiving elements 61, 62, 63 have maximum values. It should be noted that in this stage, the light blocking region of the plunger 43 still covers the opening of the second partition plate 81b corresponding to the position at which the light receiving element 64 is disposed. Therefore, the light does not reach the light receiving element 64.

When the actuation body 7 is further rotated, and the plunger 43 moves in the longitudinal direction thereof from a state shown in FIG. 13, the opening on the back surface side of the slit 74 and the opening of the second partition plate 81b corresponding to the light receiving element 64 start overlapping.

As shown in FIG. 14, when the actuation body 7 is placed at the position of 42.5 degrees, the openings on the back surface side of the slits 71 to 74 are respectively overlapped with the entire regions of the openings of the second partition plate 81b corresponding to the light receiving elements 61 to 64. Therefore, light receiving amounts of the light receiving elements 61 to 64 have maximum values.

Figure 15:
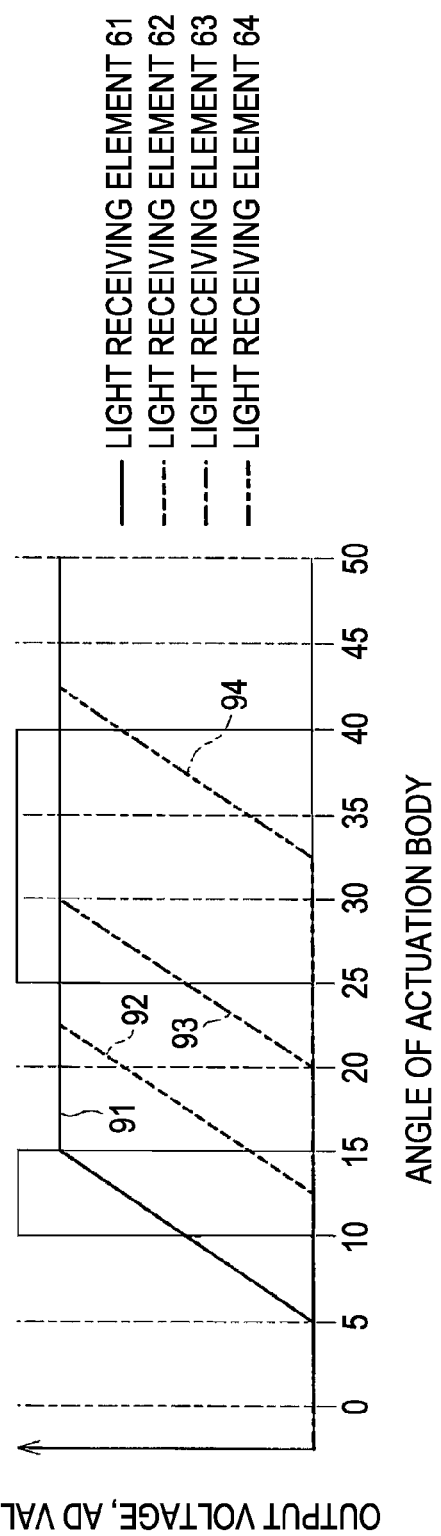
FIG. 15 is a view showing relationships between an angle of an actuation body and an output voltage of the light receiving elements.

FIG. 15 is a view showing relationships between the angle of the actuation body and output voltage of the light receiving elements. As shown in FIG. 15, four sequential lines 91 to 94 indicate the relationships between the voltages respectively outputted by the light receiving elements 61 to 64 upon respectively receiving the lights from the light emitting elements 51 to 54, and positions of the actuation body 7. The sequential line 91 corresponds to the light receiving element 61, the sequential line 92 corresponds to the light receiving element 62, the sequential line 93 corresponds to the light receiving element 63, and the sequential line 94 corresponds to the light receiving element 64.

As shown in FIG. 15, when the angle of the actuation body 7 is not less than 0 degree and less than 5 degrees, the lights respectively emitted by the light emitting elements 51 to 54 are blocked. When the angle of the actuation body 7 is not less than 12.5 degrees and less than 20 degrees, at least a part of the lights respectively emitted by the light emitting elements 51, 52 passes through, and the lights respectively emitted by the light emitting elements 53, 54 are blocked. When the angle of the actuation body 7 is not less than 20 degrees and less than 32.5 degrees, at least a part of the lights respectively emitted by the light emitting elements 51 to 53 passes through, and the lights respectively emitted by the light emitting element 54 is blocked. When the angle of the actuation body 7 is not less than 32.5 degrees and less than 50 degrees, at least a part of the lights respectively emitted by the light emitting elements 51 to 54 passes through. With the angle from 5 to 15 degrees, the output voltage from the light receiving element 61 is continuously increased in proportion to the angle. This is because size of the overlapping region of the opening of the second partition plate 81b corresponding to the light receiving element 61 and the slit 71 is increased in accordance with the increase in the angle. Similarly, the output voltage from the light receiving element 62 is continuously increased in proportion to the angle with the angle from 12.5 to 22.5 degrees, the output voltage from the light receiving element 63 is continuously increased in proportion to the angle with the angle from 20 to 30 degrees, and the output voltage from the light receiving element 64 is continuously increased in proportion to the angle with the angle from 32.5 to 42.5 degrees.

In such a way, in accordance with the increase in the angle of the actuation body 7, the light passing through the plunger 43 is increased. Conversely, in accordance with a decrease in the angle of the actuation body 7, the light passing through the plunger 43 is decreased. In such a way, the position of the plunger 43 is changed in accordance with the rotation angle of the actuation body 7 from the fixed position, and the amounts of the lights respectively received by the light receiving elements 61 to 64 are differentiated in accordance with the position of the plunger 43. When the position of the plunger 43 with which the displacement amount from the reference position is minimum among the positions of the plunger 43 with which the amounts of the light respectively incident on the light receiving elements 61 to 64 are maximum serves as a light amount maximum position, the light amount maximum positions are different among the light receiving elements 61 to 64. It should be noted that the light amount maximum position of the light receiving element 61 is a position of the plunger 43 with the actuation body 7 at 15 degrees, the light amount maximum position of the light receiving element 62 is a position of the plunger 43 with the actuation body 7 at 22.5 degrees, the light amount maximum position of the light receiving element 63 is a position of the plunger 43 with the actuation body 7 at 30 degrees, and the light amount maximum position of the light receiving element 64 is a position of the plunger 43 with the actuation body 7 at 42.5 degrees, From FIG. 15, it can be expressed that the positions (the light detection start positions) of the plunger 43 when the light receiving elements 61 to 64 start detecting the lights are different among the light receiving elements 61 to 64. Specifically, the light detection start position corresponding to the light receiving element 61 is a position of the plunger 43 when the actuation body 7 is placed at a position of 5 degrees, the light detection start position corresponding to the light receiving element 62 is a position of the plunger 43 when the actuation body 7 is placed at a position of 12.5 degrees, the light detection start position corresponding to the light receiving element 63 is a position of the plunger 43 when the actuation body 7 is placed at a position of 20 degrees, and the light detection start position corresponding to the light receiving element 64 is a position of the plunger 43 when the actuation body 7 is placed at a position of 32.5 degrees.

In such a way, the light amount maximum position and the light detection start position are different among the light receiving elements 61 to 64. Thus, a position range of the plunger 43 when the light receiving elements 61 to 64 detect the light is also different.

It should be noted that in the above description, the front surface of the plunger 43 faces the light emitting elements 51 to 54, and the back surface of the plunger 43 faces the light receiving elements 61 to 64. However, conversely, the back surface of the plunger 43 may face the light emitting elements 51 to 54, and the front surface of the plunger 43 may face the light receiving elements 61 to 64. Even in this case, the relationships between the angle of the actuation body and the output voltage of the light receiving element are the same as FIG. 15.

<Relationship Between Microcomputer and Peripheral Configuration Thereof>

Figure 16:
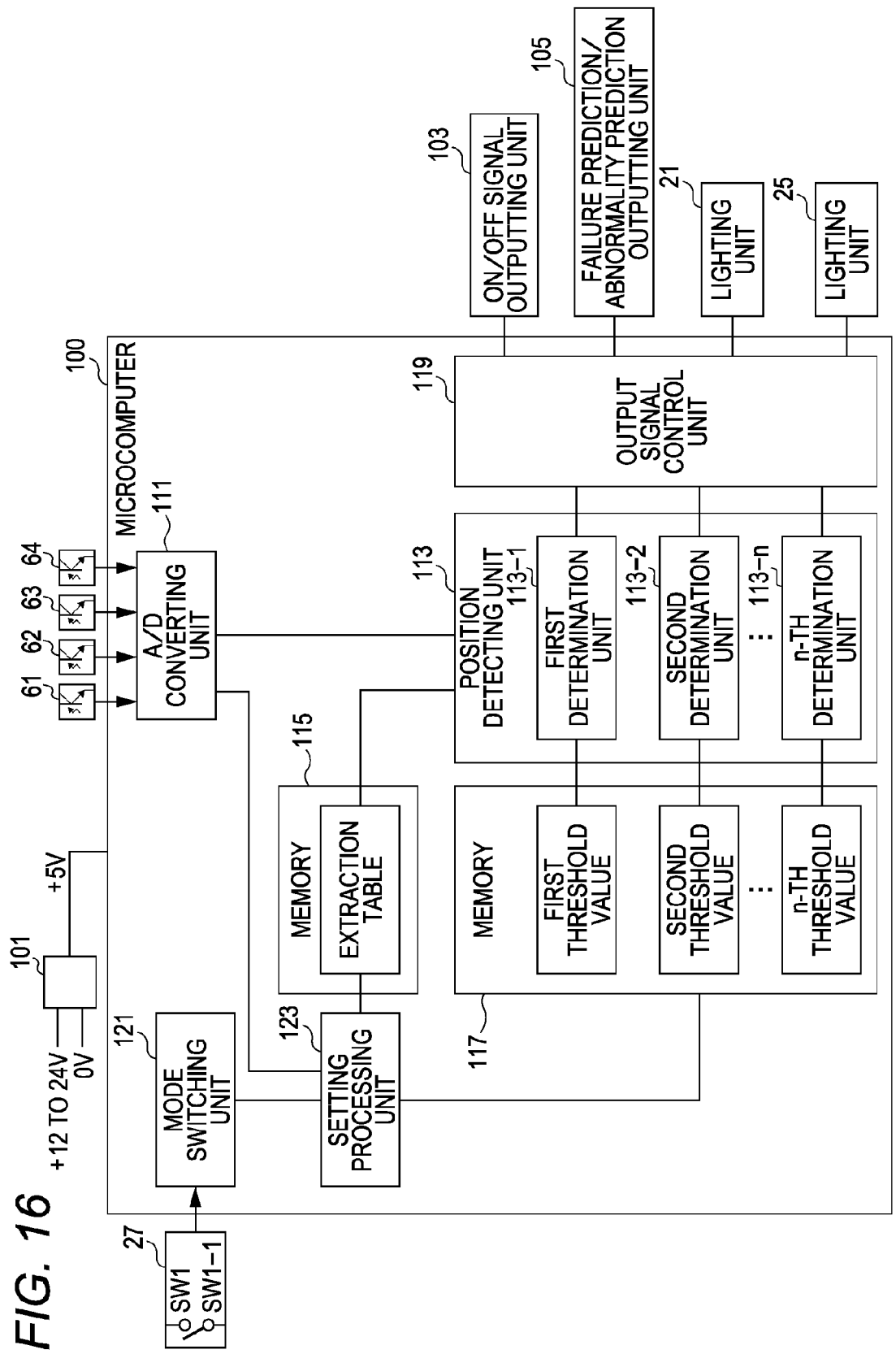
FIG. 16 is a block diagram showing an internal configuration of the switch module.

FIG. 16 is a block diagram showing a configuration of the switch module. As shown in FIG. 16, the switch module 11 includes a microcomputer 100 controlling the entire switch module 11, a low voltage circuit 101, an ON/OFF signal outputting unit (a signal output means) 103, and a failure prediction/abnormality prediction outputting unit (a signal output means) 105 in addition to the mode switch 27, the light receiving elements 61 to 64, and the lighting units (signal output means) 21, 25.

The low voltage circuit 101 converts a voltage inputted from the exterior, and outputs a voltage lower than the inputted voltage to the microcomputer 100. When the voltage is inputted from the low voltage circuit 101, the microcomputer 100 lights the lighting unit 23 shown in FIG. 2.

The light receiving element 61 outputs a voltage in accordance with the amount of the light received from the light emitting element 51 to the microcomputer 100. The light receiving element 62 outputs a voltage in accordance with the amount of the light received from the light emitting element 52 to the microcomputer 100. The light receiving element 63 outputs a voltage in accordance with the amount of the light received from the light emitting element 53 to the microcomputer 100. The light receiving element 64 outputs a voltage in accordance with the amount of the light received from the light emitting element 54 to the microcomputer 100. Here, a voltage respectively outputted from the light receiving elements 61 to 64 when the light blocking region of the plunger 43 does not exist in the light paths between the light receiving elements 61 to 64 and the light emitting elements 51 to 54 serves as a maximum voltage.

As described above, the mode switch 27 is the switch for switching the mode to any of the normal mode and the setting mode, and has the button to be pressed by the user. When the button is pressed down, the mode switch 27 outputs a LOW signal for switching the mode to the microcomputer 100. Meanwhile, in a case where the button is not pressed down, the mode switch 27 always outputs a HIGH signal to the microcomputer 100.

The ON/OFF signal outputting unit 103 is controlled by the microcomputer 100, so as to output the ON signal or the OFF signal for controlling drive of an external device serving as a control object of the limit switch 1.

The failure prediction/abnormality prediction outputting unit 105 is controlled by the microcomputer 100, so as to output a failure prediction signal or an abnormality prediction signal indicating that a failure or an abnormality generated in the limit switch 1 is predicted to the exterior.

The lighting units 21, 25 are respectively controlled by the microcomputer 100, so as to emit the light.

Next, an internal functional configuration of the microcomputer 100 will be described. It should be noted that the microcomputer 100 is provided with a CPU and a memory storing a program, and the CPU reads out the program from the memory, and the microcomputer functions to perform operation following the program. As shown in FIG. 16, the microcomputer 100 includes an A/D converting unit 111, a position detecting unit (a position detection means) 113, memories 115, 117, an output signal controlling unit 119, a mode switching unit 121, and a setting processing unit (a setting processing means) 123.

The A/D converting unit 111 receives analog voltages outputted from the light receiving elements 61 to 64, and converts values of the analog voltage into digital values.

The position detecting unit 113 detects the position of the actuation body 7 (the angle from the fixed position). The position detecting unit 113 is provided with a first determination unit 113-1 to an n-th determination unit 113-$n$. It should be noted that since functions of the first determination unit 113-1 to the n-th determination unit 113-$n$ are the same, only the first determination unit 113-1 will be described.

The first determination unit 113-1 extracts one digital value from the four digital values outputted from the A/D converting unit 111 corresponding to the light receiving elements 61 to 64. This extraction is performed with using an extraction table stored in the memory 115. The extraction table is information that, regarding a k-th determination unit (k=any of 1 to n) 113-$k$, determination unit identification information for identifying the k-th determination unit 113-$k$ is associated with light receiving element identification information for identifying the light receiving element used by the k-th determination unit 113-$k$ among the four digital values corresponding to the light receiving elements 61 to 64. FIG. 17 is one example of the extraction table. In a case of the extraction table shown in FIG. 17, the light receiving element identification information corresponding to the determination unit identification information indicating the first determination unit 113-1 indicates the light receiving element 61. Thus, the first determination unit 113-1 extracts the digital value from the light receiving element 61.

The first determination unit 113-1 compares the extracted digital value with a first threshold value stored in the memory 117, and outputs a HIGH signal in a case where the extracted digital value is not less than the first threshold value, or a LOW signal in a case where the extracted digital value is less than the first threshold value to the output signal controlling unit 119. It should be noted that a k-th threshold value stored in the memory 117 corresponds to the k-th determination unit 113-$k$, and is used by the k-th determination unit 113-$k$.

The output signal controlling unit 119 controls the ON/OFF signal outputting unit 103, the failure prediction/abnormality prediction outputting unit 105, and the lighting units 21, 25 following the signals outputted from the first determination unit 113-1 to the n-th determination unit 113-$n$. A specific example of this control will be described later.

Upon receiving the LOW signal from the mode switch 27, the mode switching unit 121 switches the mode to the setting mode, and outputs a setting instruction to the setting processing unit 123. Upon receiving a notification of setting completion from the setting processing unit 123, the mode switching unit 121 switches the mode to the normal mode. It should be noted that in a case where the mode switching unit 121 switches the mode to the normal mode, operation of the setting processing unit 123 is stopped, and the output signal controlling unit 119 is operated.

The setting processing unit 123 performs process of setting the k-th threshold value (k=any of 1 to n) stored in the memory 117, and the light receiving element identification information stored in the memory 115. The setting processing unit 123 stores previous setting object information for identifying a (k−1)-th determination unit (k=any of 1 to n) serving as a previous setting object. Upon receiving the setting instruction, the setting processing unit 123 takes the k-th determination unit 113-$k$ serving as a determination unit next to the (k−1)-th determination unit indicated by the previous setting object information as a setting object. It should be noted that in a case where the previous setting object information indicates the n-th determination unit 113-$n$, the setting processing unit 123 takes the first determination unit 113-1 as the setting object. The setting processing unit 123 performs setting processing of setting the k-th threshold value and the light receiving element identification information corresponding to the k-th determination unit 113-$k$ serving as the setting object, and when the setting processing is completed, notifies the mode switching unit 121 of the setting completion. Thereby, every time the user presses down the mode switch 27, the setting processing corresponding to the first determination unit 113-1 to the n-th determination unit 113-*n* can be successively executed.

A method of setting processing in the setting processing unit 123 is as follows. First, the setting processing unit 123 extracts one digital value among the four digital values outputted from the A/D converting unit 111 corresponding to the light receiving elements 61 to 64, the digital value being within a predetermined range excluding at least minimum voltage (0 V) and maximum voltage (5 V) among a range of the digital values (for example, a range from 0.5 to 4.5 V serving as 10% to 90% of the maximum voltage of 5 V). It should be noted that in a case where there is the plurality of light receiving elements outputting the digital values within the predetermined range, one digital value which is the closest to a center value of the predetermined range (that is, a value indicating a voltage serving as a half of the maximum voltage) may be extracted. The setting processing unit 123 updates the extraction table of the memory 115 taking information for identifying the light receiving element outputting the extracted digital value as the light receiving element identification information corresponding to the determination unit identification information indicating the k-th determination unit 113-*k* serving as the setting object. The setting processing unit 123 updates the memory 117 taking the extracted digital value as the k-th threshold value corresponding to the k-th determination unit 113-*k* serving as the setting object. Upon updating the memory 117, the setting processing unit 123 determines that the setting is completed, and notifies the mode switching unit 121 of the setting completion.

According to the above setting processing, when the user presses down the button of the mode switch 27 in a state where the actuation body 7 is displaced to a set position (that is, in a state where the plunger 43 is displaced to a designated position corresponding to the set position of the actuation body 7), the setting processing unit 123 sets the information indicating the light receiving element outputting the one digital value within the predetermined range (for example, the range from 0.5 to 4.5 V serving as 10% to 90% of the maximum voltage of 5 V) as the light receiving element identification information corresponding to the k-th determination unit 113-*k* serving as the setting object. Here, the predetermined range is a range excluding the minimum voltage and the maximum voltage. Therefore, in the range, part of the light emitted from the light receiving element is blocked by the light blocking region, and the other part of the light is incident on the light receiving element. In this range, the digital value is susceptibly changed according to the position of the plunger 43. The setting processing unit 123 sets the digital value corresponding the light receiving element indicated by the light receiving element identification information when the actuation body is placed at the set position as the k-th threshold value corresponding to the k-th determination unit 113-*k* serving as the setting object. As a result, the k-th determination unit 113-*k* can precisely detect the set position with using the digital value from the light receiving element having good sensitivity in the vicinity of the set position, and the k-th threshold value serving as the digital value of the light receiving element when the actuation body 7 is placed at the set position.

<Specific Example of Position Detection and Output Signal Control>

Next, a specific example of position detection and output signal control with using the limit switch 1 of the present embodiment will be described.

As described above, the actuation body 7 is rotated upon contact with the physical body, and the limit switch 1 outputs the ON signal to the external device serving as an operation object of the limit switch 1 in accordance with the angle of the actuation body 7 from the fixed position. However, the physical body is not always brought into contact with the actuation body 7 in the same state. There is a possibility that weight, size, a moving route, and the like are slightly changed depending on the physical body. Even when there is such a change, it is desirable that the limit switch 1 is normally operated in a state where no error is generated.

Meanwhile, in a case where the limit switch 1 is used for a long period of time, due to some causes such as vibration, there is a possibility that a relative positional relationship between the limit switch 1 and the moving route of the physical body is gradually changed. Due to such a change over a long period of time, it is thought that the angle of the actuation body 7 when the physical body is brought into contact with the actuation body 7 is gradually increased or gradually decreased. In a case where the angle of the actuation body 7 when the physical body is brought into contact with the actuation body 7 is gradually increased over a long period of time, there is likelihood that force exceeding a limit value of the angle of the actuation body 7 is applied to the actuation body 7, and a mechanical failure is generated. In a case where the angle of the actuation body 7 when the physical body is brought into contact with the actuation body 7 is gradually decreased over a long period of time, there is likelihood that the ON signal is not normally outputted. When such a failure or an abnormality occurs during operation of the production line, the entire production line has to be stopped. Therefore, it is desired to predict that there is a possibility that the failure or the abnormality would occur in the future before such a failure or the abnormality is generated.

Further, in a case where the limit switch is used for a long period of time, there is a possibility that frictional force between the actuation body 7 and the rotation shaft thereof is gradually increased due to some influences. In this case, a returning speed of the actuation body 7 to the fixed position immediately after the physical body is brought away is gradually slowed down. When the returning speed is slowed down, there is likelihood that a next physical body cannot be normally detected. Here, the returning speed at which the next physical body cannot be normally detected is a predetermined limit speed. At this time, it is desired to predict that the returning speed starts being slowed down before the returning speed becomes not less than the predetermined limit speed.

Figure 18:
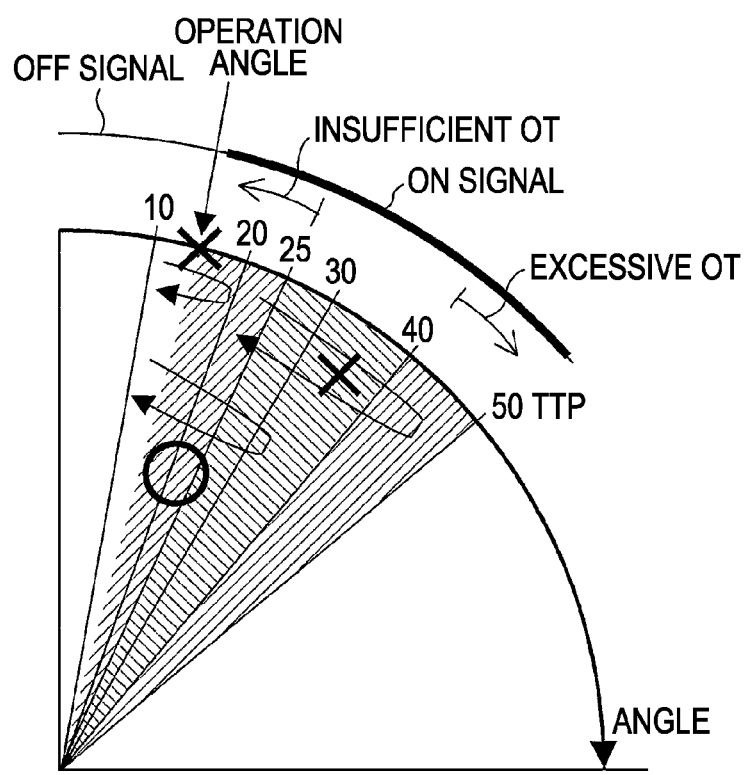
FIG. 18 is a view showing a relationship between the angle of the actuation body and operation states.

FIG. 18 is a view showing a relationship between the angle of the actuation body and operation states. Here, the relative position relationship between the moving route of the physical body and the limit switch 1 is set in such a manner that when an average physical body is brought into contact with the actuation body 7, the actuation body 7 is rotated by about 30 to 35 degrees. In addition, here the limit value of the angle of the actuation body 7 (shown as TTP in the figure) is 50 degrees.

In this case, in order to allow the limit switch 1 to output the ON signal in a normal state irrespective of an individual difference of the physical body such as the weight, the size, and the moving route, it is preferable to set an angle (such as 15 degrees) which is smaller than an average angle (30 to 35 degrees) of the actuation body 7 as an operation angle for outputting the ON signal.

In order to predict that the angle of the actuation body 7 when the physical body is brought into contact with the actuation body 7 is gradually increased over a long period of time, it is preferable to output a failure prediction signal when the angle exceeds an angle (such as 40 degrees) which is larger than the average angle of the actuation body 7 (30 to 35 degrees) and smaller than the limit value (50 degrees). This failure prediction signal indicates that there is a possibility that the failure would be generated in the future due to large force from the exterior. It should be noted that an angle range within which such a failure prediction signal is desirably outputted is shown as "Excessive OT" in the figure.

Further, in order to predict that the angle of the actuation body 7 when the physical body is brought into contact with the actuation body 7 is gradually decreased over a long period of time, it is preferable to output an insufficient rotation abnormality prediction signal when the actuation body is only rotated by an angle which is smaller than the average angle of the actuation body 7 (30 to 35 degrees) and smaller than an angle (such as 25 degrees) being larger than the angle with which the ON signal is outputted (such as 15 degrees). This insufficient rotation abnormality prediction signal indicates that there is a possibility that the abnormality would occur in the future due to small force from the exterior. It should be noted that an angle range within which such an insufficient rotation abnormality prediction signal is desirably outputted is shown as "Insufficient OT" in the figure.

Further, in order to predict that the returning speed starts being slowed down, a parameter indicating a speed at the time of returning, for example, a returning time from a time point when the angle reaches 15 degrees to a time point when the angle reaches 10 degrees at the time of returning to the fixed position is measured. A predetermined time which is shorter than a time corresponding to the predetermined limit speed and longer than a returning time at the time of normal returning is compared to the measured returning time. In a case where the measured returning time is longer than the predetermined time, it is preferable to output a returning speed abnormality prediction signal. This returning speed abnormality prediction signal is a signal indicating that the returning speed of the plunger 43 (that is, the actuation body 7) is being slowed down.

A specific example for setting the operation angle (such as 15 degrees) with which the ON signal is outputted, the angle (40 to 50 degrees) with which the failure prediction signal is outputted, the angle (15 to 25) with which the abnormality prediction signal is outputted, and the angles (such as 15 degrees and 10 degrees) used for outputting the returning speed abnormality prediction signal will be described below with reference to FIG. 19.

Figure 19A:
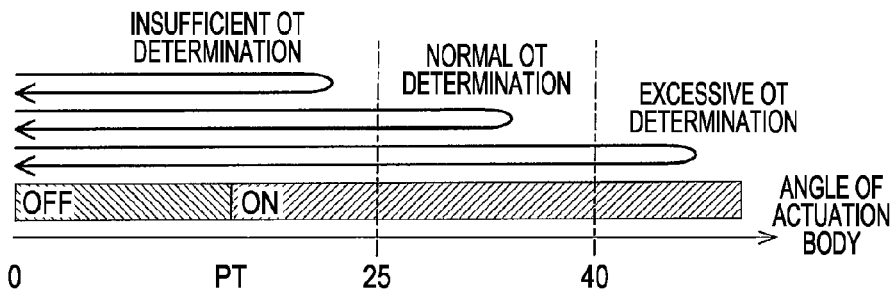
FIG. 19 is a view showing relationships between voltage values outputted from the light receiving elements, threshold values set by a setting processing unit, and signals outputted from determination units.
Figure 19B:
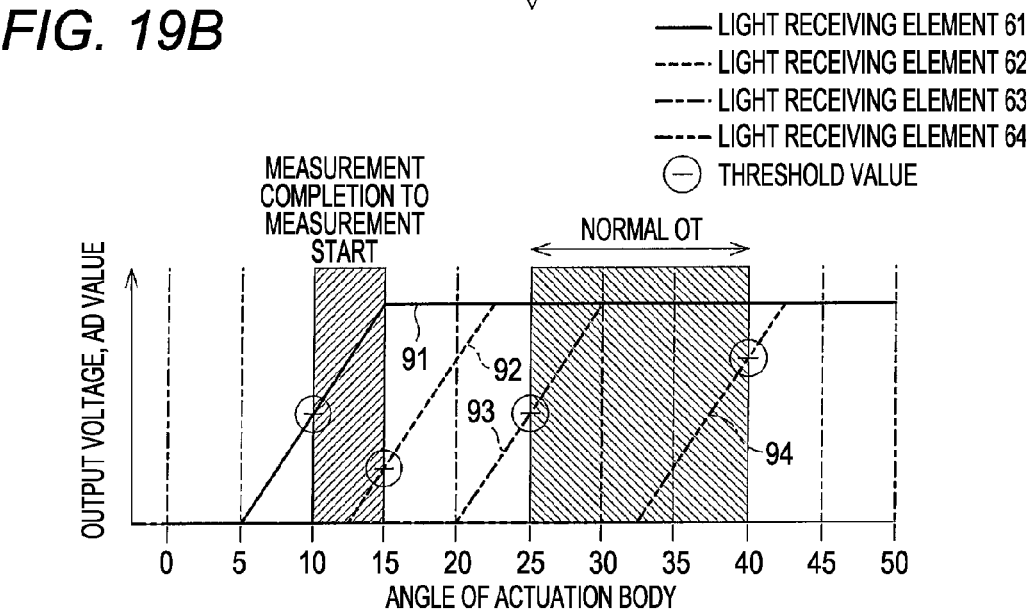
Figure 19C:
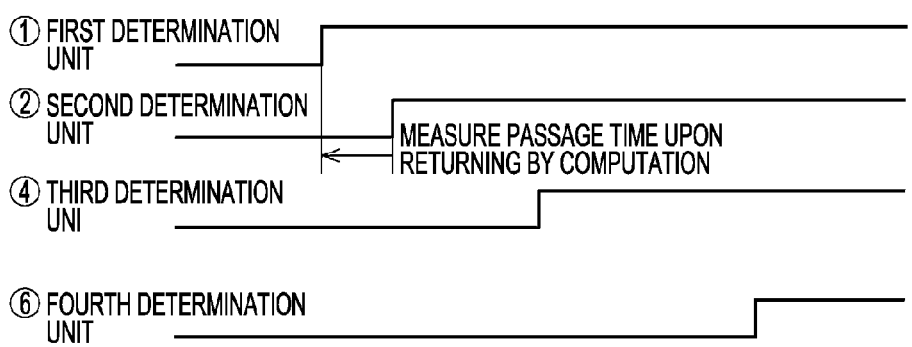

FIG. 19 is a view showing relationships among the voltage values outputted from the light receiving elements, the threshold values set by the setting processing unit, and signals outputted from the determination units. In FIG. 19, a part (a) shows a change example of the angle of the actuation body 7, a part (b) shows relationships between the voltage values outputted from the light receiving elements 61 to 64 and the threshold values set by the setting processing unit 123, and a part (c) shows the signals outputted from the position detecting unit 113.

It should be noted that the setting processing unit 123 stores information indicating the n-th determination unit 113-*n* as the previous setting object information.

The light receiving elements 61 to 64 can output 0 to 5 V as the output voltage (the digital values). Therefore, a center value is 2.5 V.

First, the user rotates the actuation body 7 only by 10 degrees from the fixed position, maintains a state where the plunger 43 is displaced to a designated position (a fourth designated position) corresponding to the position of the actuation body 7, and presses down the button of the mode switch 27. At this time, the setting processing unit 123 takes the first determination unit 113-1 as the setting object. In a case where the actuation body 7 is placed at a position of 10 degrees, as shown in the part (b) of FIG. 19, the output voltage from the light receiving element 61 is about 2.5 V, and the output voltage of the other light receiving elements 62 to 64 is 0 V. Therefore, the setting processing unit 123 sets information indicating the light receiving element 61 as the light receiving element identification information corresponding to the first determination unit 113-1 serving as the setting object. The setting processing unit 123 sets the voltage value (the digital value) outputted from the light receiving element 61 in a state where the angle of the actuation body 7 is 10 degrees as the first threshold value corresponding to the first determination unit 113-1.

Thereby, as shown in the part (c) of FIG. 19, the first determination unit 113-1 outputs the HIGH signal in a case where the output voltage value from the light receiving element 61 is not less than the first threshold value, and outputs the LOW signal in a case where the output voltage value from the light receiving element 61 is less than the first threshold value. The voltage value (the digital value) outputted from the light receiving element 61 in a state where the angle of the actuation body 7 is 10 degrees is set as the first threshold value. Therefore, it is found that the actuation body 7 is placed at the position of the angle of not less than 10 degrees in a case where the HIGH signal is outputted from the first determination unit 113-1, and the actuation body 7 is placed at the position of the angle of less than 10 degrees in a case where the LOW signal is outputted from the first determination unit 113-1. When the signal from the first determination unit 113-1 is changed from LOW to HIGH or HIGH to LOW, it is found that the angle of the actuation body 7 is 10 degrees.

Next, the user displaces the actuation body 7 to the position of 15 degrees, maintains a state where the plunger 43 is displaced to a designated position (a first designated position, a fifth designated position) corresponding to the position of the actuation body 7, and presses down the button of the mode switch 27. At this time, the setting processing unit 123 takes the second determination unit 113-2 as the setting object. In a case where the actuation body 7 is placed at the position of 15 degrees, as shown in the part (b) of FIG. 19, the output voltage from the light receiving element 62 is about 1.2 V, and the output voltage of the other light receiving elements 61, 63, 64 is 5 V or 0 V. Therefore, the setting processing unit 123 sets information indicating the light receiving element 62 as the light receiving element identification information corresponding to the second determination unit 113-2 serving as the setting object. The setting processing unit 123 sets the voltage value (the digital value) outputted from the light receiving element 62 in a state where the angle of the actuation body 7 is 15 degrees as a second threshold value corresponding to the second determination unit 113-2.

Thereby, as shown in the part (c) of FIG. 19, the second determination unit 113-2 outputs the HIGH signal in a case where the output voltage (the digital value) from the light receiving element 62 is not less than the second threshold value, and outputs the LOW signal in a case where the output voltage (the digital value) from the light receiving element 62 is less than the second threshold value. The voltage value (the digital value) outputted from the light receiving element 62 in a state where the rotation angle of the actuation body 7 is 15 degrees is set as the second threshold value. Therefore, it is found that the actuation body 7 is placed at the position of the angle of not less than 15 degrees in a case where the HIGH signal is outputted from the second determination unit 113-2, and the actuation body 7 is placed at the position of the angle of less than 15 degrees in a case where the LOW signal is outputted from the second determination unit 113-2. When the signal from the second determination unit 113-2 is changed from LOW to HIGH or HIGH to LOW, it is found that the angle of the actuation body 7 is 15 degrees.

Next, the user displaces the actuation body 7 to a position of 25 degrees, maintains a state where the plunger 43 is displaced to a designated position (a second designated position) corresponding to the position of the actuation body 7, and presses down the button of the mode switch 27. At this time, the setting processing unit 123 takes the third determination unit 113-3 as the setting object. In a case where the actuation body 7 is placed at the position of 25 degrees, as shown in the part (b) of FIG. 19, the output voltage from the light receiving element 63 is about 2.5 V, and the output voltage of the other light receiving elements 61, 62, 64 is 5 V or 0 V. Therefore, the setting processing unit 123 sets information indicating the light receiving element 63 as the light receiving element identification information corresponding to the third determination unit 113-3 serving as the setting object. The setting processing unit 123 sets the voltage value (the digital value) outputted from the light receiving element 63 in a state where the angle of the actuation body 7 is 25 degrees as a third threshold value corresponding to the third determination unit 113-3.

Thereby, as shown in the part (c) of FIG. 19, the third determination unit 113-3 outputs the HIGH signal in a case where the output voltage (the digital value) from the light receiving element 63 is not less than the third threshold value, and outputs the LOW signal in a case where the output voltage (the digital value) from the light receiving element 63 is less than the third threshold value. The voltage value (the digital value) outputted from the light receiving element 63 in a state where the angle of the actuation body 7 is 25 degrees is set as the third threshold value. Therefore, it is found that the actuation body 7 is placed at the position of the angle of not less than 25 degrees in a case where the HIGH signal is outputted from the third determination unit 113-3, and the actuation body 7 is placed at the position of the angle of less than 25 degrees in a case where the LOW signal is outputted from the third determination unit 113-3. When the signal from the third determination unit 113-3 is changed from LOW to HIGH or HIGH to LOW, it is found that the angle of the actuation body 7 is 25 degrees.

Finally, the user displaces the actuation body 7 to a position of 40 degrees, maintains a state where the plunger 43 is displaced to a designated position (a third designated position) corresponding to the position of the actuation body 7, and presses down the button of the mode switch 27. At this time, the setting processing unit 123 takes the fourth determination unit 113-4 as the setting object. In a case where the actuation body 7 is placed at the position of 40 degrees, as shown in the part (b) of FIG. 19, the output voltage from the light receiving element 64 is about 3.8 V, and the output voltage of the other light receiving elements 61 to 63 is 5 V. Therefore, the setting processing unit 123 sets information indicating the light receiving element 64 as the light receiving element identification information corresponding to the fourth determination unit 113-4 serving as the setting object. The setting processing unit 123 sets the voltage value (the digital value) outputted from the light receiving element 64 in a state where the angle of the actuation body 7 is 40 degrees as a fourth threshold value corresponding to the fourth determination unit 113-4.

Thereby, as shown in the part (c) of FIG. 19, the fourth determination unit 113-4 outputs the HIGH signal in a case where the output voltage (the digital value) from the light receiving element 64 is not less than the fourth threshold value, and outputs the LOW signal in a case where the output voltage (the digital value) from the light receiving element 64 is less than the fourth threshold value. The voltage value (the digital value) outputted from the light receiving element 64 in a state where the angle of the actuation body 7 is 40 degrees is set as the fourth threshold value. Therefore, it is found that the actuation body 7 is placed at the position of the angle of not less than 40 degrees in a case where the HIGH signal is outputted from the fourth determination unit 113-4, and the actuation body 7 is placed at the position of the angle of less than 40 degrees in a case where the LOW signal is outputted from the fourth determination unit 113-4. When the signal from the fourth determination unit 113-4 is changed from LOW to HIGH or HIGH to LOW, it is found that the angle of the actuation body 7 is 40 degrees.

The output signal controlling unit 119 is preliminarily set so as to perform the following processing upon receiving the signals from the first determination unit 113-1 to the fourth determination unit 113-4.

That is, when the signal from the second determination unit 113-2 indicates HIGH, the output signal controlling unit 119 controls the ON/OFF signal outputting unit 103 in such a manner that the ON signal is outputted, and controls the lighting unit 21 to light.

Here, as described above, the information indicating the light receiving element 62 is set as the light receiving element identification information corresponding to the second determination unit 113-2, and the output voltage (the digital value) of the light receiving element 62 when the angle of the actuation body 7 is 15 degrees is set as the second threshold value. Therefore, the operation angle with which the ON signal is outputted can be 15 degrees.

The output signal controlling unit 119 determines whether or not the signal from the third determination unit 113-3 is changed from LOW to HIGH during a time from a time point when the signal from the second determination unit 113-2 is changed from LOW to HIGH to a time point when the signal from the second determination unit 113-2 is changed from HIGH to LOW. In a case where the signal from the third determination unit 113-3 is not changed from LOW to HIGH, the output signal controlling unit 119 controls the failure prediction/abnormality prediction outputting unit 105 in such a manner that the insufficient rotation abnormality prediction signal is outputted, and controls the lighting unit 25 to blink following a first pattern.

Here, as described above, the information indicating the light receiving element 63 is set as the light receiving element identification information corresponding to the third determination unit 113-3, and the output voltage (the digital value) of the light receiving element 63 when the angle of the actuation body 7 is 25 degrees is set as the third threshold value. Therefore, an angle range within which the insufficient rotation abnormality prediction signal is outputted can be less than 25 degrees.

While the signal from the fourth determination unit 113-4 indicates HIGH, the output signal controlling unit 119 controls the failure prediction/abnormality prediction outputting unit 105 in such a manner that the failure prediction signal is outputted, and controls the lighting unit 25 to blink following a second pattern.

Here, as described above, the information indicating the light receiving element 64 is set as the light receiving element identification information corresponding to the fourth determination unit 113-4, and the output voltage (the digital value) of the light receiving element 64 when the angle of the actuation body 7 is 40 degrees is set as the fourth threshold value. Therefore, an angle range within which the failure prediction signal is outputted can be not less than 40 degrees.

Further, the output signal controlling unit 119 measures a time from a time point when the signal from the second determination unit 113-2 is changed from HIGH to LOW to a time point when the signal from the first determination unit 113-1 is changed from HIGH to LOW, and determines whether or not the measured time is longer than a predetermined time. In a case where the measured time is longer than the predetermined time, the output signal controlling unit 119 controls the failure prediction/abnormality prediction outputting unit 105 in such a manner that the returning speed abnormality prediction signal is outputted, and controls the lighting unit 25 to blink following a third pattern.

Here, as described above, the information indicating the light receiving element 61 is set as the light receiving element identification information corresponding to the first determination unit 113-1, and the output voltage (the digital value) of the light receiving element 61 when the angle of the actuation body 7 is 10 degrees is set as the first threshold value. Therefore, in accordance with a time of moving from the angle of 15 degrees to the angle of 10 degrees when the actuation body 7 is returned, the returning speed abnormality prediction signal can be outputted.

Figure 20:
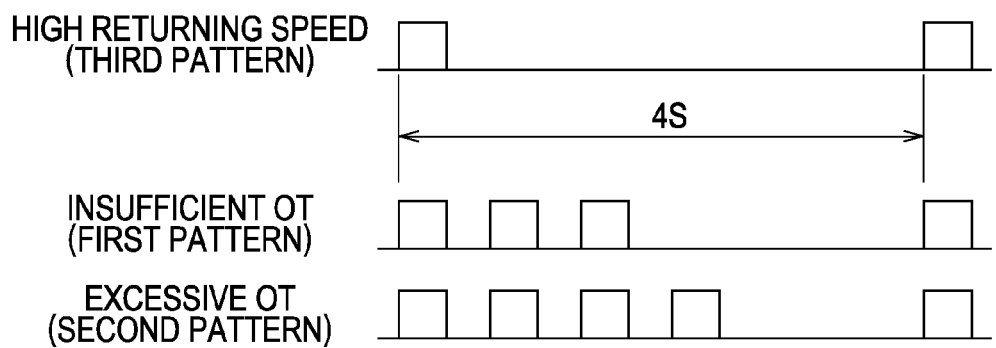
FIG. 20 is a view showing one example of a blinking pattern.

It should be noted that the above first to third patterns are different from each other in terms of the number of blinking, cycle, or the like. For example, as shown in FIG. 20, 4 seconds serve as one cycle, and the number of blinking in one cycle is changed between the patterns.

As described above, the limit switch 1 of the present embodiment is provided with the plunger (the displacement member) 43 to be displaced in accordance with the force from the exterior, and the output signal controlling unit (the signal outputting means) 119 for outputting the signal in accordance with the position of the plunger 43. The plunger 43 is disposed between the light emitting surfaces of the light emitting elements 51 to 54 and the light receiving surfaces of the light receiving elements 61 to 64, and placed at the reference position when there is no force from the exterior. The slits (the openings) 71 to 74 through which the light passes are formed in the plunger 43 in such a manner that the amounts of the lights incident on the light receiving elements 61 to 64 among the lights emitted from the light emitting elements 51 to 54 are changed in accordance with displacement of the plunger 43. Further, the limit switch 1 is provided with the setting processing unit 123 for setting the digital value (a characteristic amount) outputted from the light receiving elements 61 to 64 as the k-th threshold value when the setting instruction is inputted in a state where the plunger 43 is displaced to the designated position (for example, the position of the plunger 43 when the actuation body 7 is rotated by 10, 15, 25, or 40 degrees) by the user. Further, the limit switch 1 is provided with the position detecting unit 113 for performing the detection processing of detecting whether or not the plunger 43 is placed at a closer position to the reference position than to the designated position by comparing the set k-th threshold value and the digital value outputted from the light receiving element.

Thereby, since the amounts of the lights incident on the light receiving elements 61 to 64 are differentiated by the position of the plunger 43, the digital values outputted from the light receiving elements 61 to 64 are changed. In accordance with a user input, the digital value outputted from any of the light receiving elements 61 to 64 in a state where the plunger 43 is displaced to the designated position (for example, the position of the plunger 43 when the actuation body 7 is rotated by 10, 15, 25, or 40 degrees) is set as the threshold value, and by comparing the set threshold value and the digital value outputted from the light receiving element, whether or not the plunger 43 is placed at a closer position to the reference position than to the designated position is detected. Therefore, when the user only inputs the setting instruction in a state where the plunger 43 is displaced to the designated position, the digital value in that state is set as the threshold value, and whether or not the plunger 43 is closer to the reference position than to the designated position can be detected. As a result, the signal in accordance with a detection result on whether or not the plunger is closer to the reference position than to the designated position can be easily outputted. Thereby, the switch capable of easily outputting the signal in accordance with a desired position of the plunger 43 (that is, a desired position of the actuation body 7) without need for an adjusting screw can be provided.

<Modified Example>

In the present embodiment, the plunger 43 provided in the limit switch 1 has the slits 71 to 74 as shown in FIG. 4. However, the shapes of the slits are not limited thereto. In the present modified example, a plunger having a plurality of slits formed into a different shape from the slits 71 to 74 is provided in place of the plunger 43 provided in the limit switch 1.

Figure 21:
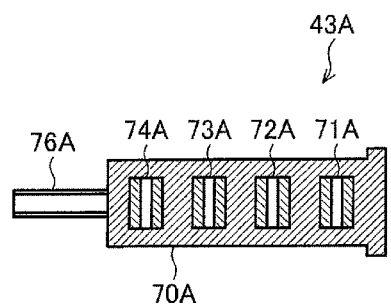
FIG. 21 is a view showing a front surface of a plunger in a modified example.
Figure 22:
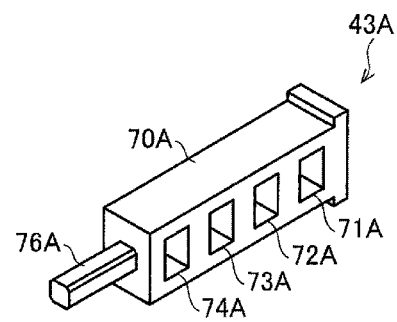
FIG. 22 is a perspective view of the plunger in the modified example seen from the front surface side.
Figure 23:
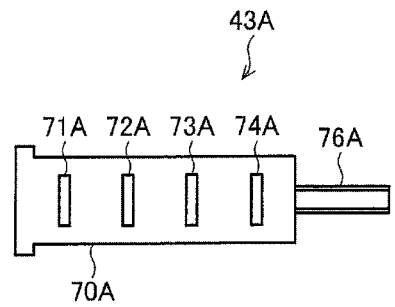
FIG. 23 is a view showing a back surface of the plunger in the modified example.
Figure 24:
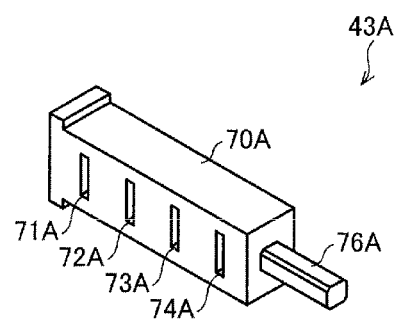
FIG. 24 is a perspective view of the plunger in the modified example seen from the back surface side.
Figure 25:
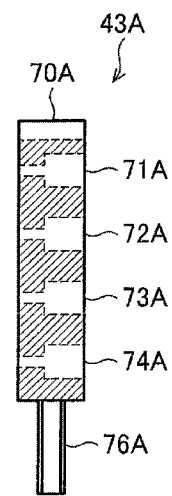
FIG. 25 is a view showing a cross section of the plunger in the modified example.

FIG. 21 is a view showing a front surface of the plunger in the modified example. FIG. 22 is a perspective view of the plunger in the modified example seen from the front surface side. FIG. 23 is a view showing a back surface of the plunger in the modified example. FIG. 24 is a perspective view of the plunger in the modified example seen from the back surface side. FIG. 25 is a view showing a cross section of the plunger in the modified example. As shown in FIGS. 21 to 25, a plunger 43A has a main body portion 70A and a projection portion 76A.

The projection portion 76A is combined with the main body portion 70A and is thinner than the main body portion 70A. The projection portion 76A is inserted into the coil spring 42. The projection portion 76A is inserted into the hole provided in the third partition plate 81c as well as the projection portion 76. When the plunger 43A moves in parallel toward the third partition plate 81c in accordance with the movement of the actuation body 7, the coil spring 42 is compressed between the main body portion 70A of the plunger 43A and the third partition plate 81c so as to give force of returning the plunger 43A to the reference position to the plunger 43A.

The main body portion 70A has slits 71A to 74A. Since shapes of the slits 71A to 74A are the same, the slit 71A will be described. An opening of the slit 71A has different sizes respectively for the front surface and the back surface of the plunger 43A. Specifically, a shape of the opening of the slit 71A in the cross section is a shape of regions not indicated by diagonal lines among a region surrounded by broken lines as shown in FIG. 25. The size of the opening on the back surface of the slit 71A is the same as the size of the opening of the second partition plate 81b.

Figure 26:
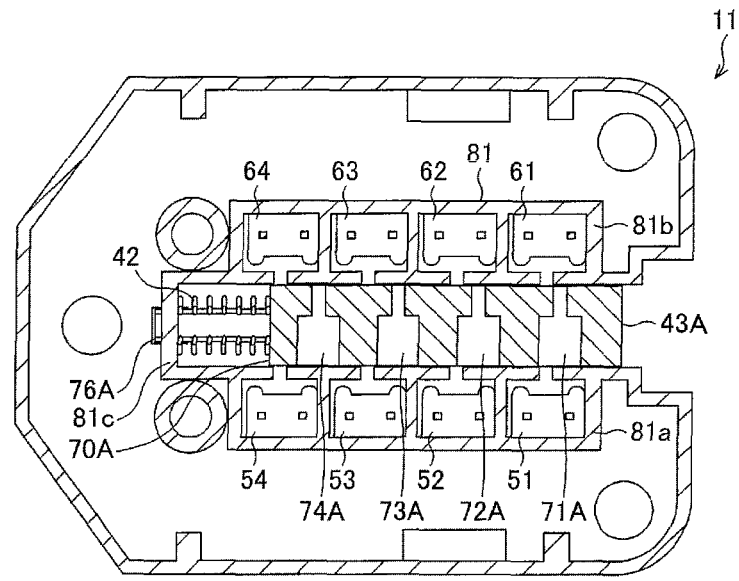
FIG. 26 is a first view showing a positional relationship between the plurality of light emitting elements, the plurality of light receiving elements, and the plunger in the modified example in the cross section of the switch module.
Figure 27:
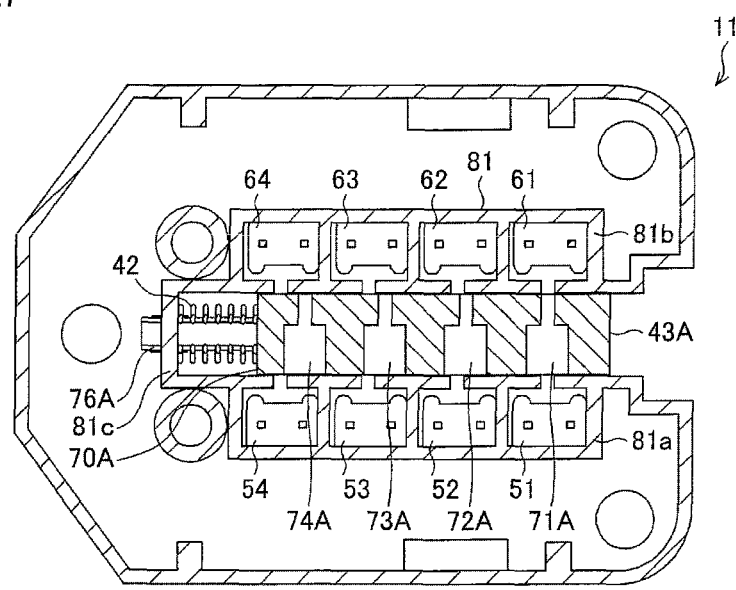
FIG. 27 is a second view showing a positional relationship between the plurality of light emitting elements, the plurality of light receiving elements, and the plunger in the modified example in the cross section of the switch module.
Figure 28:
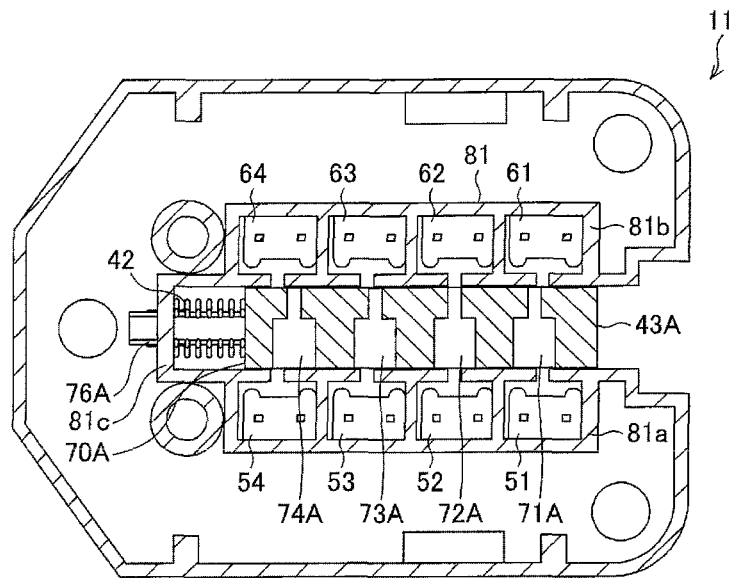
FIG. 28 is a third view showing a positional relationship between the plurality of light emitting elements, the plurality of light receiving elements, and the plunger in the modified example in the cross section of the switch module.
Figure 29:
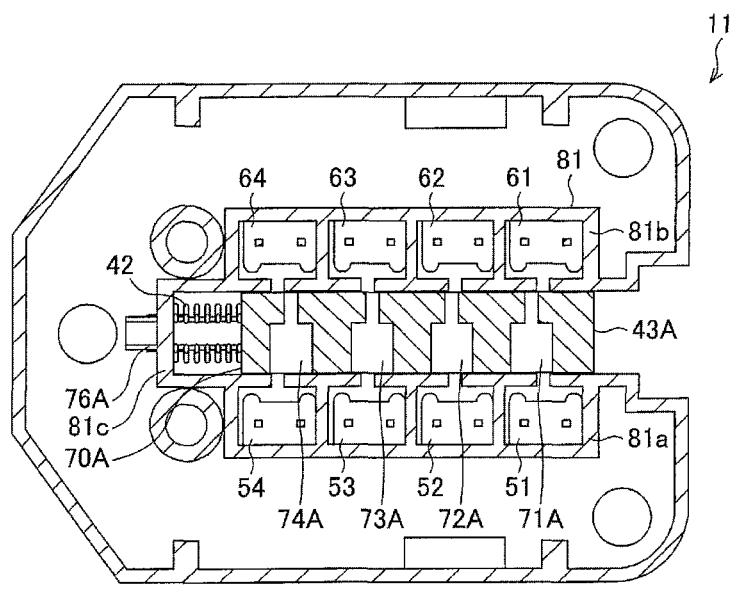
FIG. 29 is a fourth view showing a positional relationship between the plurality of light emitting elements, the plurality of light receiving elements, and the plunger in the modified example in the cross section of the switch module.
Figure 30:
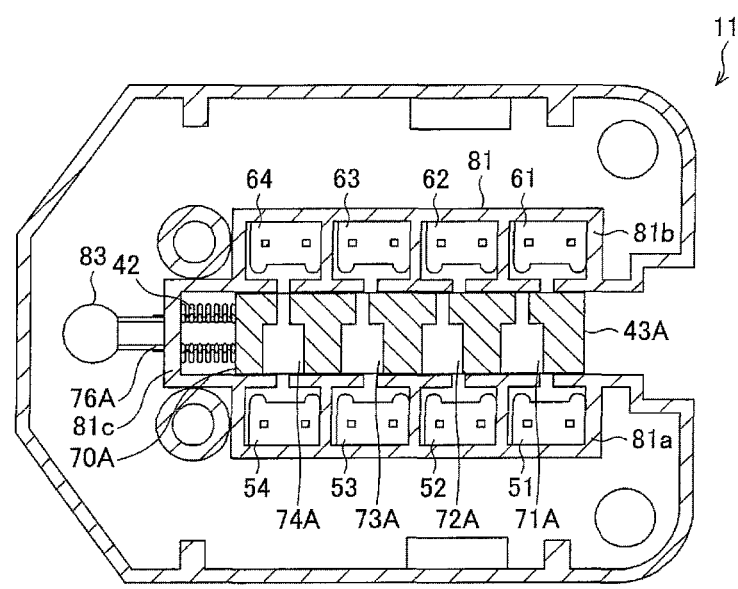
FIG. 30 is a fifth view showing a positional relationship between the plurality of light emitting elements, the plurality of light receiving elements, and the plunger in the modified example in the cross section of the switch module.
Figure 31A:
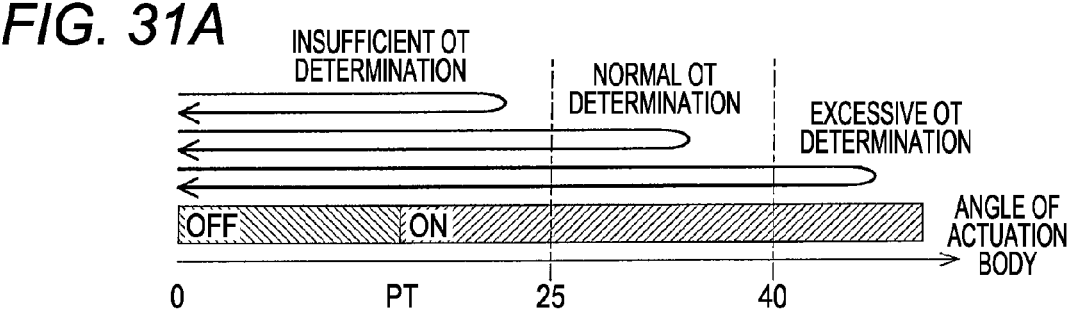
FIG. 31 is a view showing relationships between voltage values outputted from the light receiving elements, threshold values set by a setting processing unit, and signals outputted from the determination units in the modified example.
Figure 31B:
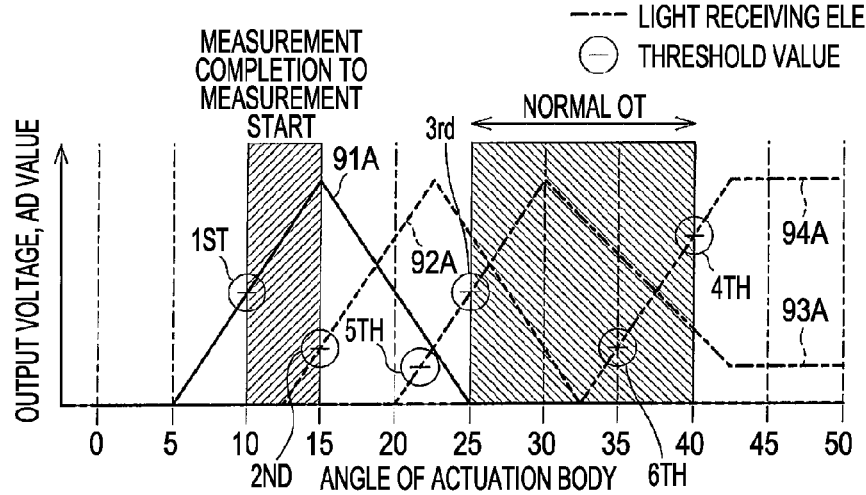
Figure 31C:
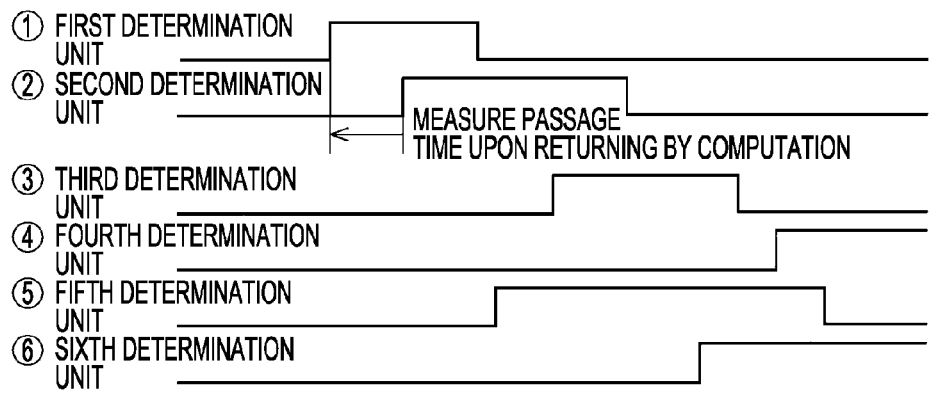
Figure 31D:
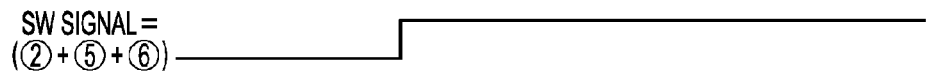

FIGS. 26 to 30 are views showing positional relationships among the plurality of light emitting elements, the plurality of light receiving elements, and the plunger in the modified example in the cross section of the switch module. It should be noted that FIG. 26 is a view when the actuation body 7 is placed at the fixed position, FIG. 27 is a view when the actuation body 7 is placed at the position of 15 degrees, FIG. 28 is a view when the actuation body 7 is placed at the position of 22.5 degrees, FIG. 29 is a view when the actuation body 7 is placed at the position of 30 degrees, and FIG. 30 is a view when the actuation body 7 is placed at the position of 42.5 degrees. Here, the positions at which the light emitting elements 51 to 54, the light receiving elements 61 to 64, and the partition plate 81 are disposed are the same as FIG. 10.

As shown in FIGS. 26 to 30, the front surface of the plunger 43 faces the light emitting elements 51 to 54, and the back surface of the plunger 43 faces the light receiving elements 61 to 64. It should be noted that as shown in FIG. 25, a part of the main body portion 70A of the plunger 43A other than the slits 71A to 74A is indicated by diagonal lines. The part of the diagonal lines serves as the light blocking region.

As well as the plunger 43, the position of the plunger 43A is changed in conjunction with the movement of the actuation body 7, and the lights emitted by the light emitting elements 51 to 54 are blocked or pass through in accordance with the change in the position. Specifically, in the plunger 43A, in the middle of movement of the plunger 43A, the slits 71A to 74A are respectively formed in the plunger 43A so as to be overlapped with the openings of the first partition plate 81a corresponding to the light emitting elements 51 to 54 and the openings of the second partition plate 81b corresponding to the light receiving elements 61 to 64.

As well as the slits 71 to 74, a distance between each of the openings on the back surface side of the slits 71A to 74A and each of the openings of the second partition plate 81b corresponding to the slits is different among the slits 71A to 74A. Specifically, as shown in FIG. 26, positions of the slits 71A to 74A are set in such a manner that when the actuation body 7 is placed at the fixed position (that is, when the plunger 43A is placed at the reference position), the distance is gradually increased in the order of a distance between the opening on the back surface side of the slit 71A and the opening of the second partition plate 81b corresponding to the slit 71A, a distance between the opening on the back surface side of the slit 72A and the opening of the second partition plate 81b corresponding to the slit 72A, a distance between the opening on the back surface side of the slit 73A and the opening of the second partition plate 81b corresponding to the slit 73A, and a distance between the opening on the back surface side of the slit 74A and the opening of the second partition plate 81b corresponding to the slit 74A.

Hereinafter, with reference to FIGS. 26 to 30, as the rotation angle of the actuation body 7 from the fixed position is changed, how presence or absence of the light incidence on the light receiving elements 61 to 64 and the amounts of the incident light are changed will be described.

As shown in FIG. 26, the plunger 43A blocks all the lights emitted by the light emitting elements 51 to 54 when the actuation body 7 is placed at the position of 0 degree (the fixed position). Therefore, the lights respectively emitted by the light emitting elements 51 to 54 are blocked by the plunger 43A and do not reach the light receiving elements 61 to 64.

From a state shown in FIG. 26, the actuation body 7 is rotated, and the plunger 43A moves in the longitudinal direction thereof. At this time, as described above, the distance between the opening on the back surface side of the slit 71A and the opening of the second partition plate 81b corresponding to the slit 71A is shorter than the distances corresponding to the other slits 72A to 74A. Thus, only the opening on the back surface side of the slit 71A and the opening of the second partition plate 81b corresponding to the light receiving element 61 start overlapping. After that, when a movement amount of the plunger 43A is increased with the increase in the angle of the actuation body 7, an overlapping region of the opening on the back surface side of the slit 71A and the opening of the second partition plate 81b corresponding to the light receiving element 61 is increased, and the opening on the back surface side of the slit 72A and the opening of the second partition plate 81b corresponding to the light receiving element 62 start overlapping.

As shown in FIG. 27, in a case where the actuation body 7 is placed at the position of 15 degrees, the opening on the back surface side of the slit 71A matches with the opening of the second partition plate 81b corresponding to the light receiving element 61. In other words, the slit 71A exists all over the space (the light path region) linearly connecting the opening corresponding to the position at which the light emitting element 51 is disposed in the first partition plate 81a and the opening corresponding to the position at which the light receiving element 61 is disposed in the second partition plate 81b. At this time, the opening on the back surface side of the slit 72A is overlapped with part of the opening of the second partition plate 81b corresponding to the light receiving element 62. Therefore, the light receiving amount of the light receiving element 61 has a maximum value, and the light receiving element 62 receives only part of the light emitted from the light emitting element 52. In this stage, the light blocking region of the plunger 43A still covers the openings corresponding to the positions at which the light receiving elements 63, 64 are disposed. Therefore, the light does not reach the light receiving elements 63, 64.

From a state shown in FIG. 27, the actuation body 7 is further rotated, and the plunger 43A moves in the longitudinal direction thereof. At this time, when the movement amount of the plunger 43A is increased, an overlapping area of the opening on the back surface side of the slit 71A and the opening of the second partition plate 81b corresponding to the light receiving element 61 is decreased, and an overlapping area of the opening on the back surface side of the slit 72A and the opening of the second partition plate 81b corresponding to the light receiving element 62 is increased. The opening on the back surface side of the slit 73A and the opening of the second partition plate 81b corresponding to the light receiving element 63 start overlapping.

As shown in FIG. 28, when the actuation body 7 is placed at the position of 22.5 degrees, the opening on the back surface side of the slit 72A matches with the opening of the second partition plate 81b corresponding to the light receiving element 62. The openings on the back surface side of the slits 71A, 73A are respectively overlapped with part of the openings of the second partition plate 81b corresponding to the light receiving elements 61, 63. Therefore, the light receiving amount of the light receiving element 62 has a maximum value, and the lights emitted by the light emitting elements 51, 53 partially pass through the slits 71A, 73A, and reach the light receiving elements 61, 63. It should be noted that in this stage, the light blocking region of the plunger 43A still covers the opening corresponding to the position at which the light receiving element 64 is disposed. Therefore, the light does not reach the light receiving element 64.

From a state shown in FIG. 28, the actuation body 7 is further rotated, and the plunger 43A moves in the longitudinal direction thereof. At this time, when the movement amount of the plunger 43A is increased, the light blocking region covers the opening of the second partition plate 81b corresponding to the light receiving element 61. The overlapping area of the opening on the back surface side of the slit 72A and the opening of the second partition plate 81b corresponding to the light receiving element 62 is decreased. Further, an overlapping area of the opening on the back surface side of the slit 73A and the opening of the second partition plate 81b corresponding to the light receiving element 63 is increased.

As shown in FIG. 29, when the actuation body 7 is placed at the position of 30 degrees, the opening of the second partition plate 81b corresponding to the light receiving element 61 is completely covered by the light blocking region again. The opening on the back surface side of the slit 72A is overlapped with part of the opening of the second partition plate 81b corresponding to the light receiving element 62. Further, the opening on the back surface side of the slit 73A matches with the opening of the second partition plate 81b corresponding to the light receiving element 63. Therefore, the light does not reach the light receiving element 61, the light receiving amount of the light receiving element 63 has a maximum value, and the light emitted by the light emitting element 52 partially passes through the slit 72A, and reaches the light receiving element 62. It should be noted that in this stage, the light blocking region of the plunger 43A still covers the opening corresponding to the position at which the light receiving element 64 is disposed. Therefore, the light does not reach the light receiving element 64.

From a state shown in FIG. 29, the actuation body 7 is further rotated, and the plunger 43A moves in the longitudinal direction thereof. At this time, when the movement amount of the plunger 43A is increased, the light blocking region covers the opening of the second partition plate 81b corresponding to the light receiving element 62. The overlapping area of the opening on the back surface side of the slit 73A and the opening of the second partition plate 81b corresponding to the light receiving element 63 is decreased. Further, the opening on the back surface side of the slit 74A and the opening of the second partition plate 81b corresponding to the light receiving element 64 start overlapping.

As shown in FIG. 30, when the actuation body 7 is placed at the position of 42.5 degrees, the openings of the second partition plate 81b corresponding to the light receiving elements 61, 62 are completely covered by the light blocking region again. The opening on the back surface side of the slit 73A is overlapped with part of the opening of the second partition plate 81b corresponding to the light receiving element 63. Further, the opening on the back surface side of the slit 74A matches with the opening of the second partition plate 81b corresponding to the light receiving element 64. Therefore, the light does not reach the light receiving elements 61, 62, the light receiving amount of the light receiving element 64 has a maximum value, and the light emitted by the light emitting element 53 partially passes through the slit 73A, and reaches the light receiving element 63.

It should be noted that the actuation body 7 can be displaced by the angle from 42.5 degrees to 50 degrees. However, when the actuation body 7 is placed at the angle of 42.5 degrees, the plunger 43A is brought into contact with a fixing member 83. Therefore, when the actuation body 7 is placed at the angle from the 42.5 degrees to 50 degrees, the plunger 43A is in the same state as FIG. 30.

Hereinafter, a specific example of the position detection and the output signal control in the present modified example will be described. FIG. 31 is a view showing relationships among the voltage values outputted from the light receiving elements, the threshold values set by the setting processing unit 123, and the signals outputted from the determination units. In FIG. 31, a part (a) shows a change example of the rotation angle of the actuation body, a part (b) shows relationships between the voltage values outputted from the light receiving elements 61 to 64 and the threshold values set by the setting processing unit 123, a part (c) shows the signals outputted from the position detecting unit 113, and a part (d) shows one example of signal generation in the output signal controlling unit 119.

It should be noted that in the present modified example, the setting processing unit 123 sets the information indicating the light receiving element selected according to the user input among the light receiving elements 61 to 64 outputting the output voltages (the digital values) within the predetermined range (such as 0.5 to 4.5 V) as the light receiving element identification information. Alternatively, the setting processing unit 123 may preliminarily store priority degrees of the light receiving elements 61 to 64, and in a case where there is the plurality of light receiving elements 61 to 64 outputting the output voltages (the digital values) within the predetermined range, may select the light receiving element of the highest priority degree among the plurality of light receiving elements.

As shown in the part (b) of FIG. 31, four sequential lines 91A to 94A indicate relationships between the voltages respectively outputted by the light receiving elements 61 to 64 upon respectively receiving the lights from the light emitting elements 51 to 54, and the angles at which the actuation body 7 is placed. The sequential line 91A corresponds to the light receiving element 61, the sequential line 92A corresponds to the light receiving element 62, the sequential line 93A corresponds to the light receiving element 63, and the sequential line 94A corresponds to the light receiving element 64.

As shown in the part (b) of FIG. 31, the light receiving element 61 receives the light when the angle at which the actuation body 7 is placed is not less than 5 degrees and less than 25 degrees. The light receiving amount thereof becomes maximum when the angle is 15 degrees. The light receiving element 62 receives the light when the angle at which the actuation body 7 is placed is not less than 12.5 degrees and less than 32.5 degrees. The light receiving amount thereof becomes maximum when the angle is 22.5 degrees. The light receiving element 63 receives the light when the angle at which the actuation body 7 is placed is not less than 20 degrees and less than 50 degrees. The light receiving amount thereof becomes maximum when the angle is 30 degrees. The light receiving element 64 receives the light when the angle at which the actuation body 7 is placed is not less than 32.5 degrees and less than 50 degrees. The light receiving amount thereof becomes maximum when the angle is from 42.5 degrees to 50 degrees.

First, the user maintains a state where the actuation body 7 is rotated only by 10 degrees from the fixed position, and presses down the button of the mode switch 27. At this time, as well as the above description, the setting processing unit 123 sets the information indicating the light receiving element 61 as the light receiving element identification information corresponding to the first determination unit 113-1 serving as the setting object. As shown in the part (b) of FIG. 31, the setting processing unit 123 sets the voltage value (the digital value) outputted from the light receiving element 61 when the angle of the actuation body 7 is 10 degrees as the first threshold value corresponding to the first determination unit 113-1.

Next, the user maintains a state where the actuation body 7 is rotated only by 15 degrees from the fixed position, and presses down the button of the mode switch 27. At this time, as well as the above description, the setting processing unit 123 sets the information indicating the light receiving element 62 as the light receiving element identification information corresponding to the second determination unit 113-2 serving as the setting object. As shown in the part (b) of FIG. 31, the setting processing unit 123 sets the voltage value (the digital value) outputted from the light receiving element 62 when the angle at which the actuation body 7 is placed is 15 degrees as the second threshold value corresponding to the second determination unit 113-2.

Next, the user maintains a state where the actuation body 7 is rotated only by 25 degrees from the fixed position, and presses down the button of the mode switch 27. At this time, the light receiving element 62 and the light receiving element 63 output the output voltages (the digital values) of 0.5 to 4.5 V. However, by preliminarily grasping the sequential lines 92A, 93A as shown in the part (b) of FIG. 31, the user may select the light receiving element 63 whose output voltage is increased more with the angle of not less than 25 degrees than with the angle of less than 25 degrees. As a result, the setting processing unit 123 sets the information indicating the light receiving element 63 as the light receiving element identification information corresponding to the third determination unit 113-3 serving as the setting object. As shown in the part (b) of FIG. 31, the setting processing unit 123 sets the voltage value (the digital value) outputted from the light receiving element 63 when the angle at which the actuation body 7 is placed is 25 degrees as the third threshold value corresponding to the third determination unit 113-3.

Next, the user maintains a state where the actuation body 7 is rotated only by 40 degrees from the fixed position, and presses down the button of the mode switch 27. At this time, the light receiving element 63 and the light receiving element 64 output the output voltages (the digital values) of 0.5 to 4.5 V. However, by preliminarily grasping the sequential lines 93A, 94A as shown in the part (b) of FIG. 31, the user may select the light receiving element 64 whose output voltage is increased more with the angle of not less than 40 degrees than with the angle of less than 40 degrees. As a result, the setting processing unit 123 sets the information indicating the light receiving element 64 as the light receiving element identification information corresponding to the fourth determination unit 113-4 serving as the setting object. The setting processing unit 123 sets the voltage value (the digital value) outputted from the light receiving element 64 when the angle at which the actuation body 7 is placed is 40 degrees as the fourth threshold value corresponding to the fourth determination unit 113-4.

Next, the user maintains a state where the actuation body 7 is rotated only by 22 degrees from the fixed position, and presses down the button of the mode switch 27. At this time, the light receiving element 61 and the light receiving element 63 output the output voltage (the digital values) of 0.5 to 4.5 V. However, by preliminarily grasping the sequential lines 91A, 93A as shown in the part (b) of FIG. 31, the user may select the light receiving element 63 whose output voltage is increased more with the angle of not less than 22 degrees than with the angle of less than 22 degrees. As a result, the setting processing unit 123 sets the information indicating the light receiving element 63 as the light receiving element identification information corresponding to a fifth determination unit serving as the setting object. The setting processing unit 123 sets the voltage value (the digital value) outputted from the light receiving element 63 when the angle at which the actuation body 7 is placed is 22 degrees as a fifth threshold value corresponding to the fifth determination unit.

Finally, the user maintains a state where the actuation body 7 is rotated only by 35 degrees from the fixed position, and presses down the button of the mode switch 27. At this time, the light receiving element 63 and the light receiving element 64 output the output voltages (the digital values) of 0.5 to 4.5 V. However, by preliminarily grasping the sequential lines 93A, 94A as shown in the part (b) of FIG. 31, the user may select the light receiving element 64 whose output voltage is increased more with the angle of not less than 35 degrees than with the angle of less than 35 degrees. As a result, the setting processing unit 123 sets the information indicating the light receiving element 64 as the light receiving element identification information corresponding to a sixth determination unit serving as the setting object. The setting processing unit 123 sets the voltage value (the digital value) outputted from the light receiving element 64 when the angle at which the actuation body 7 is placed is 35 degrees as a sixth threshold value corresponding to the sixth determination unit.

By setting in such a way, the first determination unit 113-1 to the sixth determination unit output the signals as shown in the part (c) of FIG. 31. It should be noted that in the part (c) of FIG. 31, a horizontal axis indicates the angle at which the actuation body 7 is placed as well as the part (b).

The output signal controlling unit 119 is preliminarily set so as to perform the following processing upon receiving the signals from the first determination unit 113-1 to the sixth determination unit.

That is, the output signal controlling unit 119 generates a signal as shown in the part (d) of FIG. 31 by performing OR processing of the signal from the second determination unit 113-2, the signal from the fifth determination unit, and the signal from the sixth determination unit. It should be noted that in the part (d) of FIG. 31, a horizontal axis indicates the angle at which the actuation body 7 is placed as well as the part (b). That is, when the angle at which the actuation body 7 is placed is not less than 15 degrees, the HIGH signal is generated. While the generated signal indicates HIGH, the output signal controlling unit 119 controls the ON/OFF signal outputting unit 103 in such a manner that the ON signal is outputted, and controls the lighting unit 21 to light.

Other processing including output processing of the insufficient rotation abnormality prediction signal, output processing of the failure prediction signal, and output processing of the returning speed abnormality prediction signal in the output signal controlling unit 119 is the same as the above description in which the plunger 43 is used.

It should be noted that in the above description of FIGS. 26 to 30, the front surface of the plunger 43A faces the light emitting elements 51 to 54, and the back surface of the plunger 43A faces the light receiving elements 61 to 64. However, conversely, the back surface of the plunger 43A may face the light emitting elements 51 to 54, and the front surface of the plunger 43A may face the light receiving elements 61 to 64. Even in this case, the relationships between the angle of the actuation body and the output voltage of the light receiving elements are the same as FIG. 31.

In such a way, even in the present modified example, since the amounts of the lights incident on the light receiving elements 61 to 64 are differentiated by the position of the plunger 43A, the digital values outputted from the light receiving elements 61 to 64 are changed. In accordance with the user input, the digital value outputted from any of the light receiving elements 61 to 64 in a state where the plunger 43A is displaced to the designated position (for example, the position of the plunger 43A when the actuation body 7 is rotated by 10, 15, 25, or 40 degrees) is set as the threshold value, and by comparing the set threshold value and the digital value outputted from the light receiving element, whether or not the plunger 43A is placed at a closer position to the reference position than to the designated position can be detected. Therefore, when the user only inputs the setting instruction in a state where the plunger 43A is displaced to the designated position, the digital value in that state is set as the threshold value, and whether or not the plunger 43A is closer to the reference position than to the designated position can be detected. As a result, the signal in accordance with a detection result on whether or not the plunger is closer to the reference position than to the designated position can be easily outputted. Thereby, the switch capable of easily outputting the signal in accordance with a desired position of the plunger 43A (that is, the desired position of the actuation body 7) without need for the adjusting screw can be provided.

In accordance with operation of rotating the actuation body 7 provided in the limit switch 1, the position of the plunger 43, 43A is displaced. However, the present invention is not limited to the method by which the position of the plunger 43 is displaced in conjunction with the rotation movement of the actuation body 7. As a method of displacing the position of the plunger 43, 43A by operation other than the rotation of the actuation body 7, for example the method described in Non-patent Document 1 can be utilized.

As described above, a switch of the present invention includes a displacement member to be displaced in accordance with a load of force from an exterior, a signal output means for outputting a signal in accordance with a position of the displacement member, a light emitting element for emitting light from a light emitting surface, and a light receiving element having a light receiving surface facing the light emitting surface, the light receiving element for outputting a characteristic amount indicating an amount of the light incident on the light receiving surface, wherein the displacement member is disposed between the light emitting surface and the light receiving surface, and placed at a reference position when there is no load of the force from the exterior, an opening through which the light passes is formed in the displacement member in such a manner that the amount of the light incident on the light receiving surface among the light emitted from the light emitting surface is changed in accordance with displacement of the displacement member, the switch further includes a setting processing means for setting the characteristic amount outputted from the light receiving element as a threshold value when a setting instruction is inputted in a state where the displacement member is displaced to a designated position, and a position detection means for performing detection processing of detecting whether or not the displacement member is placed at a closer position to the reference position than to the designated position by comparing the threshold value set by the setting processing means and the characteristic amount outputted from the light receiving element, and the signal output means outputs the signal based on a result of the detection processing performed by the position detection means.

Further, in the switch of the present invention, preferably, the plurality of light emitting elements and the plurality of light receiving elements are provided, when a pair of the light emitting element and the light receiving element facing each other serves as a light detection unit, the openings are formed in the displacement member so as to respectively correspond to the plurality of light detection units, and when regarding each of the plurality of light detection units, the position of the displacement member with which a displacement amount from the reference position is minimum among the positions of the displacement member with which the amount of the light incident on the light receiving element of the light detection unit is maximum serves as a light amount maximum position, the light amount maximum position is different among the plurality of light detection units.

Alternatively, in the switch of the present invention, preferably, the plurality of light emitting elements and the plurality of light receiving elements are provided, when a pair of the light emitting element and the light receiving element facing each other serves as a light detection unit, the plurality of openings is formed in the displacement member so as to correspond to the light detection units, and when regarding each of the light detection units, the position of the displacement member with which a displacement amount from the reference position is minimum among the positions of the displacement member with which the light passing through the opening is detected by the light detection unit serves as a light detection start position, a distance from the reference position to the light detection start position is different among the plurality of light detection units.

According to the above configuration, a range of the position of the displacement member when the light receiving elements receive the lights emitted from the light emitting elements is different among the light detection units. Therefore, by using the plurality of light detection units, the position of the displacement member within a wider range can be detected.

Further, in the switch of the present invention, preferably, the plurality of designated positions is provided, the setting processing means respectively sets the light detection units used for detecting the designated positions for the plurality of designated positions, and sets the characteristic amounts outputted from the light receiving elements of the light detection units as the threshold values corresponding to the designated positions, and the position detection means performs the detection processing for each of the plurality of designated positions by comparing the threshold values set by the setting processing means in correspondence with the designated positions and the characteristic amounts outputted from the light receiving elements of the light detection units set by the setting processing means in correspondence with the designated positions.

According to the above configuration, the position detection means can easily detect the plurality of designated positions. As a result, the switch can output various signals in accordance with the plurality of designated positions.

Further, in the switch of the present invention, preferably, in a case where the position detection means detects that the displacement member is not placed at a closer position to the reference position than to the designated position, the signal output means outputs an ON signal for driving an external device as the signal.

According to the above configuration, by only inputting the setting instruction in a state where the displacement member is displaced to the designated position, the user can easily set the designated position of the displacement member when the ON signal for driving the external device is outputted.

Further, in the switch of the present invention, preferably, the signal outputs means output a plurality of signals, the designated positions include a first designated position, and a second designated position more distant from the reference position than the first designated position, in a case where the position detection means detects that the displacement member is not placed at a closer position to the reference position than to the first designated position, the signal output means outputs an ON signal for driving an external device as one of the plurality of signals, and in a case where the position detection means does not detect that the displacement member is not placed at a closer position to the reference position than to the second designated position within a period from when the position detection means detects that the displacement member is not placed at a closer position to the reference position than to the first designated position until when the position detection means detects that the displacement member is placed at a closer position to the reference position than to the first designated position, the signal output means outputs a failure prediction signal indicating that the load of the force from the exterior is small as one of the plurality of signals.

When the switch is continuously used for a long period of time, it is thought that the load of the force applied from the exterior is gradually decreased due to some influences. Meanwhile, in a case where the switch is installed in the production line, there is a need for avoiding as far as possible stoppage of the production line due to an error that the ON signal is not normally outputted even when the force from the exterior is applied. According to the above configuration, in a case where the position detection means does not detect that the displacement member is not placed at a closer position to the reference position than to the second designated position within the period from when the position detection means detects that the displacement member is not placed at a closer position to the reference position than to the first designated position until when the position detection means detects that the displacement member is placed at a closer position to the reference position than to the first designated position, the failure prediction signal is outputted. Here, the first designated position is an operation point with which the ON signal is outputted, and the second designated position is a more distant position from the reference position than the first designated position. Therefore, by only confirming the failure prediction signal before the error is generated due to some influences, that is, before the displacement member does not reach the first designated position even when the force from the exterior is applied, the user can easily recognize that the load of the force from the exterior is gradually decreased.

Further, in the switch of the present invention, preferably, the signal output means outputs a plurality of signals, the designated positions include a first designated position, and a third designated position more distant from the reference position than the first designated position, in a case where the position detection means detects that the displacement member is not placed at a closer position to the reference position than to the first designated position, the signal output means outputs an ON signal for driving an external device as one of the plurality of signals, and in a case where the position detection means detects that the displacement member is not placed at a closer position to the reference position than to the third designated position, the signal output means outputs a failure prediction signal indicating that the load of the force from the exterior is large as one of the plurality of signals.

When the switch is continuously used for a long period of time, it is thought that the load of the force applied from the exterior is gradually increased due to some influences. When the load of the force applied from the exterior exceeds a limit value, there is likelihood that the switch is broken. According to the above configuration, in a case where the position detection means detects that the displacement member is not placed at a closer position to the reference position than to the third designated position, the failure prediction signal is outputted. Here, the third designated position is a more distant position from the reference position than the first designated position serving as the operation point at which the ON signal is outputted. Therefore, by designating the position of the displacement member when smaller force than force with which the switch is possibly broken is applied as the third designated position, the user can preliminarily recognize that the load of the force from the exterior is gradually increased.

Further, in the switch of the present invention, preferably, the designated positions include a fourth designated position, and a fifth designated position more distant from the reference position than the fourth designated position, and the signal output means measures a time from a time point when the position detection means detects that the displacement member is placed at the fifth designated position to a time point when the position detection means detects that the displacement member is placed at the fourth designated position, the time being after the position detection means detects that the displacement member is not placed at a closer position to the reference position than to the fifth designated position, and outputs a failure prediction signal as the signal in a case where the measured time is larger than a predetermined time.

When the switch is continuously used for a long period of time, it is thought that the returning speed when the displacement member is returned to the reference position after the displacement member is displaced is slowed down due to some influences such as an increase in the frictional force. When the returning speed is slowed down, there is sometimes a case where switch operation cannot be normally performed when next force from the exterior is applied. According to the above configuration, in a case where the time from the time point when the position detection means detects that the displacement member is placed at the fifth designated position to the time point when the position detection means detects that the displacement member is placed at the fourth designated position is larger than the predetermined time, the failure prediction signal is outputted as the above signal. Therefore, the user can preliminarily recognize that the returning speed is being slowed down.

The present invention is not limited to the above embodiment but various modifications can be achieved within a range described in the claims. An embodiment obtained by appropriately combining techniques respectively disclosed in different modes is also included in a technical scope of the present invention.

INDUSTRIAL APPLICABILITY

The present invention can be utilized as a limit switch used in a production line or the like.

DESCRIPTION OF SYMBOLS

1: Limit switch
3: Casing
5: Installment block
7: Actuation body
11: Switch module
21, 25: Lighting unit (signal output means)
41: Photointerrupter unit
43, 43A: Plunger (displacement member)
51 to 54: Light emitting element
61 to 64: Light receiving element
71 to 74, 71A to 74A: Slit
100: Microcomputer
103: ON/OFF signal outputting unit (signal output means)
105: Failure prediction/abnormality prediction outputting unit (signal output means)
113: Position detecting unit (position detection means)
113-1 to 113-$n$: First determination unit to n-th determination unit
115, 117: Memory
119: Output signal controlling unit (signal output means)
123: Setting processing unit (setting processing means)

The invention claimed is:

1. A switch, comprising:
   a displacement member to be displaced in accordance with a load of force from an exterior;
   a signal output means for outputting a signal in accordance with a position of the displacement member;
   a light emitting element for emitting light from a light emitting surface; and
   a light receiving element having a light receiving surface facing the light emitting surface, the light receiving element for outputting a characteristic amount indicating an amount of the light incident on the light receiving surface, wherein,
   the displacement member is disposed between the light emitting surface and the light receiving surface, and placed at a reference position when there is no load of the force from the exterior,
   an opening through which the light passes is formed in the displacement member in such a manner that the amount of the light incident on the light receiving surface among the light emitted from the light emitting surface is changed in accordance with displacement of the displacement member,
   the switch further comprises:
   a setting processing means for setting the characteristic amount outputted from the light receiving element as a threshold value when a setting instruction is inputted in a state where the displacement member is displaced to a designated position; and
   a position detection means for performing detection processing of detecting whether or not the displacement member is placed at a closer position to the reference position than to the designated position by comparing the threshold value set by the setting processing means and the characteristic amount outputted from the light receiving element, and
   the signal output means outputs the signal based on a result of the detection processing performed by the position detection means.

2. The switch according to claim 1, wherein
   the plurality of light emitting elements and the plurality of light receiving elements are provided,
   when a pair of the light emitting element and the light receiving element facing each other serves as a light detection unit,
   the openings are formed in the displacement member so as to respectively correspond to the plurality of light detection units, and
   when regarding each of the plurality of light detection units, the position of the displacement member with which a displacement amount from the reference position is minimum among the positions of the displacement member with which the amount of the light incident on the light receiving element of the light detection unit is maximum serves as a light amount maximum position,
   the light amount maximum position is different among the plurality of light detection units.

3. The switch according to claim 1, wherein
   the plurality of light emitting elements and the plurality of light receiving elements are provided,
   when a pair of the light emitting element and the light receiving element facing each other serves as a light detection unit,
   the plurality of openings is formed in the displacement member so as to correspond to the light detection units, and
   when regarding each of the light detection units, the position of the displacement member with which a displacement amount from the reference position is minimum among the positions of the displacement member with which the light passing through the opening is detected by the light detection unit serves as a light detection start position,
   a distance from the reference position to the light detection start position is different among the plurality of light detection units.

4. The switch according to claim 2, wherein
   the plurality of designated positions is provided,
   the setting processing means respectively sets the light detection units used for detecting the designated positions for the plurality of designated positions, and sets the characteristic amounts outputted from the light receiving elements of the light detection units as the threshold values corresponding to the designated positions, and
   the position detection means performs the detection processing for the plurality of designated positions by comparing the threshold values set by the setting processing means in correspondence with the designated positions and the characteristic amounts outputted from the light receiving elements of the light detection units set by the setting processing means in correspondence with the designated positions.

5. The switch according to any one of claims 1 to 4, wherein
   in a case where the position detection means detects that the displacement member is not placed at a closer position to the reference position than to the designated position, the signal output means outputs an ON signal for driving an external device as the signal.

6. The switch according to claim 4, wherein
   the signal output means outputs a plurality of signals,
   the designated positions include a first designated position, and a second designated position more distant from the reference position than the first designated position,
   in a case where the position detection means detects that the displacement member is not placed at a closer position to the reference position than to the first designated position, the signal output means outputs an ON signal for driving an external device as one of the plurality of signals, and
   in a case where the position detection means does not detect that the displacement member is not placed at a closer position to the reference position than to the second designated position within a period from when the position detection means detects that the displacement member is not placed at a closer position to the reference position than to the first designated position until when the position detection means detects that the displacement member is placed at a closer position to the reference position than to the first designated position, the signal output means outputs a failure prediction signal indicating that the load of the force from the exterior is small as one of the plurality of signals.

7. The switch according to claim 4,
   wherein the signal output means outputs a plurality of signals, the designated positions include a first designated position, and a third designated position more distant from the reference position than the first designated position,
   in a case where the position detection means detects that the displacement member is not placed at a closer position to the reference position than to the first designated position, the signal output means outputs an ON signal for driving an external device as one of the plurality of signals, and in a case where the position detection means detects that the displacement member is not placed at a closer position to the reference position than to the third designated position, the signal output means outputs a failure prediction signal indicating that the load of the force from the exterior is large as one of the plurality of signals.

8. The switch according to claim 4, wherein the designated positions include a fourth designated position, and a fifth designated position more distant from the reference position than the fourth designated position, and the signal output means measures a time from a time point when the position detection means detects that the displacement member is placed at the fifth designated position to a time point when the position detection means detects that the displacement member is placed at the fourth designated position, the time being after the position detection means detects that the displacement member is not placed at a closer position to the reference position than to the fifth designated position, and outputs a failure prediction signal as the signal in a case where the measured time is larger than a predetermined time.

* * * * *